(12) United States Patent
Schneider

(10) Patent No.: US 8,635,340 B1
(45) Date of Patent: Jan. 21, 2014

(54) METHOD, PRODUCT, AND APPARATUS FOR REQUESTING A NETWORK RESOURCE

(75) Inventor: Eric Schneider, Delray Beach, FL (US)

(73) Assignee: ESDR Network Solutions LLC, Wilmington, DE (US)

( * ) Notice: Subject to any disclaimer, the term of this patent is extended or adjusted under 35 U.S.C. 154(b) by 783 days.

(21) Appl. No.: 11/687,672

(22) Filed: Mar. 19, 2007

Related U.S. Application Data

(63) Continuation of application No. 09/682,133, filed on Jul. 25, 2001, now Pat. No. 7,194,552, which is a continuation of application No. 09/525,350, filed on Mar. 15, 2000, now Pat. No. 6,338,082.

(60) Provisional application No. 60/175,825, filed on Jan. 13, 2000, provisional application No. 60/160,125, filed on Oct. 18, 1999, provisional application No. 60/157,075, filed on Oct. 1, 1999, provisional application No. 60/130,136, filed on Apr. 20, 1999, provisional application No. 60/125,531, filed on Mar. 22, 1999.

(51) Int. Cl.
*G06F 15/173* (2006.01)

(52) U.S. Cl.
USPC ............... 709/226; 709/219; 709/229

(58) Field of Classification Search
USPC ......... 709/200, 203, 217–221, 223–224, 226, 709/229, 245
See application file for complete search history.

(56) References Cited

U.S. PATENT DOCUMENTS

| | | | |
|---|---|---|---|
| 4,155,042 A | 5/1979 | Permut et al. |
| 4,190,800 A | 2/1980 | Kelly, Jr. et al. |
| 4,196,310 A | 4/1980 | Forman et al. |
| 4,390,876 A | 6/1983 | Bjorklund et al. |
| 4,486,853 A | 12/1984 | Parsons |
| 4,754,326 A | 6/1988 | Kram et al. |
| 4,811,382 A | 3/1989 | Sleevi |
| 4,823,265 A | 4/1989 | Nelson |
| 4,903,206 A | 2/1990 | Itoh et al. |

(Continued)

FOREIGN PATENT DOCUMENTS

| | | |
|---|---|---|
| JP | 54136617 | 10/1979 |
| JP | 11085492 | 3/1999 |

(Continued)

OTHER PUBLICATIONS

Oesterreichishe Gesellshaft Fur Unwelt Und Technik; iea-experts group on r&d priority setting and evaluation liberalisation of the electricity market; http:-www.oegut.at; Mar. 18, 2002; Austria (in English); pp. 4 (Sections 3 & 4), 7 Section 3), 8 (Controllable "Dispatchable" Loads; Section 2), 9 (Distributed Energy Resources).

(Continued)

*Primary Examiner* — Patrice Winder
(74) *Attorney, Agent, or Firm* — Fitch, Even, Tabin & Flannery LLP

(57) ABSTRACT

When a network resource request having a domain name is received, it is determined whether the network resource can be accessed from the domain name. Rather than displaying an error message or processing a search request in response to determining that a network resource can not be accessed, the domain name can instead be redirected to a registration service for domain names or keyword advertiser registration.

28 Claims, 23 Drawing Sheets

(56) References Cited

U.S. PATENT DOCUMENTS

| | | |
|---|---|---|
| 4,956,771 A | 9/1990 | Neustaedter |
| 4,956,875 A | 9/1990 | Bernard et al. |
| 5,109,486 A | 4/1992 | Seymour |
| 5,155,837 A | 10/1992 | Liu et al. |
| 5,155,847 A | 10/1992 | Kirouac et al. |
| 5,175,681 A | 12/1992 | Iwai et al. |
| 5,231,570 A | 7/1993 | Lee |
| 5,249,230 A | 9/1993 | Mihm, Jr. |
| 5,249,275 A | 9/1993 | Srivastava |
| 5,319,699 A | 6/1994 | Kerihuel et al. |
| 5,321,740 A | 6/1994 | Gregorek et al. |
| 5,386,369 A | 1/1995 | Christiano |
| 5,402,490 A | 3/1995 | Mihm, Jr. |
| 5,404,231 A | 4/1995 | Bloomfield |
| 5,404,505 A | 4/1995 | Levinson |
| 5,418,951 A | 5/1995 | Damashek |
| 5,437,031 A | 7/1995 | Kitami |
| 5,444,823 A | 8/1995 | Nguyen |
| 5,446,891 A | 8/1995 | Kaplan et al. |
| 5,454,105 A | 9/1995 | Hatakeyama et al. |
| 5,500,561 A | 3/1996 | Wilhelm |
| 5,534,734 A | 7/1996 | Pugh et al. |
| 5,535,257 A | 7/1996 | Goldberg et al. |
| 5,544,036 A | 8/1996 | Brown, Jr. et al. |
| 5,548,726 A * | 8/1996 | Pettus ............................ 709/221 |
| 5,572,438 A | 11/1996 | Ehlers et al. |
| 5,576,700 A | 11/1996 | Davis et al. |
| 5,592,620 A | 1/1997 | Chen et al. |
| 5,598,464 A | 1/1997 | Hess et al. |
| 5,600,778 A | 2/1997 | Swanson et al. |
| 5,603,034 A | 2/1997 | Swanson |
| 5,623,679 A | 4/1997 | Rivette et al. |
| 5,623,681 A | 4/1997 | Rivette et al. |
| 5,625,818 A | 4/1997 | Zarmer et al. |
| 5,634,016 A | 5/1997 | Steadham, Jr. et al. |
| 5,634,048 A * | 5/1997 | Ryu et al. ............................. 1/1 |
| 5,640,561 A | 6/1997 | Satoh et al. |
| 5,644,625 A | 7/1997 | Solot |
| 5,649,186 A | 7/1997 | Ferguson |
| 5,664,170 A | 9/1997 | Taylor |
| 5,673,252 A | 9/1997 | Johnson et al. |
| 5,684,710 A | 11/1997 | Ehlers et al. |
| 5,692,132 A | 11/1997 | Hogan |
| 5,696,695 A | 12/1997 | Ehlers et al. |
| 5,699,428 A | 12/1997 | McDonnal et al. |
| 5,701,399 A | 12/1997 | Lee et al. |
| 5,708,709 A | 1/1998 | Rose |
| 5,721,897 A | 2/1998 | Rubinstein |
| 5,742,818 A | 4/1998 | Shoroff et al. |
| 5,745,360 A | 4/1998 | Leone et al. |
| 5,761,083 A | 6/1998 | Brown, Jr. et al. |
| 5,761,689 A | 6/1998 | Rayson et al. |
| 5,764,906 A | 6/1998 | Edelstein et al. |
| 5,777,989 A * | 7/1998 | McGarvey .................... 709/249 |
| 5,778,367 A | 7/1998 | Wesinger, Jr. et al. |
| 5,790,790 A | 8/1998 | Smith et al. |
| 5,802,524 A | 9/1998 | Flowers et al. |
| 5,812,776 A | 9/1998 | Gifford |
| 5,813,007 A | 9/1998 | Nielsen |
| 5,815,830 A | 9/1998 | Anthony |
| 5,835,087 A | 11/1998 | Herz et al. |
| 5,841,850 A | 11/1998 | Fan |
| 5,842,203 A | 11/1998 | D'Elena et al. |
| 5,848,396 A | 12/1998 | Gerace |
| 5,857,201 A | 1/1999 | Wright, Jr. et al. |
| 5,870,546 A | 2/1999 | Kirsch |
| 5,881,131 A | 3/1999 | Farris et al. |
| 5,890,172 A | 3/1999 | Borman et al. |
| 5,892,919 A | 4/1999 | Nielsen |
| 5,892,920 A | 4/1999 | Arvidsson et al. |
| 5,895,454 A | 4/1999 | Harrington |
| 5,898,836 A * | 4/1999 | Freivald et al. ............... 709/218 |
| 5,907,680 A | 5/1999 | Nielsen |
| 5,908,467 A | 6/1999 | Barrett et al. |
| 5,913,215 A | 6/1999 | Rubinstein et al. |
| 5,926,116 A | 7/1999 | Kitano et al. |
| 5,933,604 A | 8/1999 | Inakoshi |
| 5,937,037 A | 8/1999 | Kamel et al. |
| 5,937,162 A | 8/1999 | Funk et al. |
| 5,940,847 A | 8/1999 | Fein et al. |
| 5,944,787 A | 8/1999 | Zoken |
| 5,949,419 A | 9/1999 | Domine et al. |
| 5,953,400 A | 9/1999 | Rosenthal et al. |
| 5,953,721 A | 9/1999 | Doi et al. |
| 5,963,205 A | 10/1999 | Sotomayor |
| 5,963,915 A | 10/1999 | Kirsch |
| 5,970,680 A | 10/1999 | Powers |
| 5,974,453 A | 10/1999 | Andersen et al. |
| 5,978,806 A | 11/1999 | Lund |
| 5,978,817 A | 11/1999 | Giannandrea et al. |
| 5,978,828 A | 11/1999 | Greer et al. |
| 5,978,842 A | 11/1999 | Noble et al. |
| 5,982,863 A | 11/1999 | Smiley et al. |
| 5,987,464 A | 11/1999 | Schneider |
| 5,987,508 A | 11/1999 | Agraharam et al. |
| 5,991,368 A | 11/1999 | Quatse et al. |
| 5,991,751 A | 11/1999 | Rivette et al. |
| 5,995,594 A | 11/1999 | Shaffer et al. |
| 5,999,907 A | 12/1999 | Donner |
| 5,999,912 A | 12/1999 | Wodarz et al. |
| 6,003,061 A | 12/1999 | Jones et al. |
| 6,003,077 A | 12/1999 | Bawden et al. |
| 6,003,082 A | 12/1999 | Gampper et al. |
| 6,006,264 A | 12/1999 | Colby et al. |
| 6,006,265 A | 12/1999 | Rangan et al. |
| 6,009,150 A | 12/1999 | Kamel |
| 6,009,459 A | 12/1999 | Belfiore et al. |
| 6,012,066 A | 1/2000 | Discount et al. |
| 6,014,660 A | 1/2000 | Lim et al. |
| 6,018,619 A | 1/2000 | Allard et al. |
| 6,018,768 A | 1/2000 | Ullman et al. |
| 6,021,433 A | 2/2000 | Payne et al. |
| 6,023,724 A | 2/2000 | Bhatia et al. |
| 6,029,195 A | 2/2000 | Herz |
| 6,032,150 A | 2/2000 | Nguyen |
| 6,038,601 A | 3/2000 | Lambert et al. |
| 6,041,324 A * | 3/2000 | Earl et al. ...................... 709/219 |
| 6,057,834 A | 5/2000 | Pickover |
| 6,058,250 A | 5/2000 | Harwood et al. |
| 6,058,355 A | 5/2000 | Ahmed et al. |
| 6,061,700 A | 5/2000 | Brobst et al. |
| 6,061,734 A | 5/2000 | London |
| 6,061,738 A | 5/2000 | Osaku et al. |
| 6,065,054 A | 5/2000 | Dutcher et al. |
| 6,085,242 A | 7/2000 | Chandra |
| 6,091,956 A | 7/2000 | Hollenberg |
| 6,092,100 A | 7/2000 | Berstis et al. |
| 6,094,665 A | 7/2000 | Lyons et al. |
| 6,097,108 A | 8/2000 | Tweed |
| 6,098,099 A | 8/2000 | Ellesson et al. |
| 6,104,582 A | 8/2000 | Cannon et al. |
| 6,104,990 A | 8/2000 | Chaney et al. |
| 6,105,098 A | 8/2000 | Ninose et al. |
| 6,119,153 A | 9/2000 | Dujari et al. |
| 6,119,234 A | 9/2000 | Aziz et al. |
| 6,122,520 A | 9/2000 | Want et al. |
| 6,122,627 A | 9/2000 | Carey et al. |
| 6,125,361 A | 9/2000 | Chakrabarti et al. |
| 6,128,623 A | 10/2000 | Mattis et al. |
| 6,134,588 A | 10/2000 | Guenthner et al. |
| 6,137,873 A | 10/2000 | Gilles |
| 6,141,408 A | 10/2000 | Garfinkle |
| 6,141,653 A | 10/2000 | Conklin et al. |
| 6,148,289 A | 11/2000 | Virdy |
| 6,148,342 A | 11/2000 | Ho |
| 6,151,622 A | 11/2000 | Fraenkel et al. |
| 6,151,624 A | 11/2000 | Teare et al. |
| 6,154,600 A | 11/2000 | Newman et al. |
| 6,154,725 A | 11/2000 | Donner |
| 6,154,771 A | 11/2000 | Rangan et al. |
| 6,154,777 A | 11/2000 | Ebrahim |
| 6,157,292 A | 12/2000 | Piercy et al. |
| 6,167,389 A | 12/2000 | Davis et al. |
| 6,167,449 A * | 12/2000 | Arnold et al. .................. 709/227 |

(56) References Cited

U.S. PATENT DOCUMENTS

| | | | |
|---|---|---|---|
| 6,169,476 B1 | 1/2001 | Flanagan | |
| 6,173,406 B1 | 1/2001 | Wang et al. | |
| 6,181,787 B1 | 1/2001 | Malik | |
| 6,181,985 B1 | 1/2001 | O'Donnell et al. | |
| 6,182,142 B1 * | 1/2001 | Win et al. | 709/219 |
| 6,182,148 B1 | 1/2001 | Tout | |
| 6,182,227 B1 | 1/2001 | Blair et al. | |
| 6,185,619 B1 | 2/2001 | Joffe et al. | |
| 6,189,030 B1 | 2/2001 | Kirsch et al. | |
| 6,195,691 B1 * | 2/2001 | Brown | 709/219 |
| 6,199,076 B1 | 3/2001 | Logan et al. | |
| 6,202,087 B1 | 3/2001 | Gadish | |
| 6,205,139 B1 | 3/2001 | Voit | |
| 6,209,048 B1 | 3/2001 | Wolff | |
| 6,212,565 B1 | 4/2001 | Gupta | |
| 6,219,696 B1 | 4/2001 | Wynblatt et al. | |
| 6,219,709 B1 | 4/2001 | Byford | |
| 6,229,532 B1 | 5/2001 | Fujii | |
| 6,230,168 B1 | 5/2001 | Unger et al. | |
| 6,240,360 B1 | 5/2001 | Phelan | |
| 6,240,555 B1 | 5/2001 | Shoff et al. | |
| 6,249,817 B1 | 6/2001 | Nakabayashi et al. | |
| 6,256,671 B1 | 7/2001 | Strentzsch et al. | |
| 6,256,739 B1 | 7/2001 | Skopp et al. | |
| 6,259,771 B1 | 7/2001 | Kredo et al. | |
| 6,259,972 B1 | 7/2001 | Sumic et al. | |
| 6,269,361 B1 | 7/2001 | Davis et al. | |
| 6,282,511 B1 | 8/2001 | Mayer | |
| 6,292,172 B1 | 9/2001 | Makhlouf | |
| 6,292,709 B1 | 9/2001 | Uhl et al. | |
| 6,297,819 B1 | 10/2001 | Furst | |
| 6,298,327 B1 | 10/2001 | Hunter et al. | |
| 6,298,341 B1 * | 10/2001 | Mann et al. | 707/3 |
| 6,298,352 B1 | 10/2001 | Kannan et al. | |
| 6,311,214 B1 | 10/2001 | Rhoads | |
| 6,314,469 B1 | 11/2001 | Tan et al. | |
| 6,321,222 B1 | 11/2001 | Soderstrom et al. | |
| 6,321,242 B1 | 11/2001 | Fogg et al. | |
| 6,324,538 B1 | 11/2001 | Wesinger, Jr. et al. | |
| 6,324,585 B1 | 11/2001 | Zhang et al. | |
| 6,324,650 B1 | 11/2001 | Ogilvie | |
| 6,332,141 B2 | 12/2001 | Gonzalez et al. | |
| 6,332,158 B1 * | 12/2001 | Risley et al. | 709/219 |
| 6,338,082 B1 | 1/2002 | Schneider | |
| 6,339,767 B1 | 1/2002 | Rivette et al. | |
| 6,339,786 B1 | 1/2002 | Ueda et al. | |
| 6,356,422 B1 | 3/2002 | Bilac et al. | |
| 6,356,898 B2 | 3/2002 | Cohen et al. | |
| 6,360,256 B1 | 3/2002 | Lim | |
| 6,363,433 B1 | 3/2002 | Nakajima | |
| 6,366,298 B1 | 4/2002 | Haitsuka et al. | |
| 6,366,906 B1 | 4/2002 | Hoffman | |
| 6,381,627 B1 | 4/2002 | Kwan et al. | |
| 6,381,651 B1 | 4/2002 | Nishio et al. | |
| 6,385,620 B1 | 5/2002 | Kurzius et al. | |
| 6,389,462 B1 | 5/2002 | Cohen et al. | |
| 6,393,117 B1 | 5/2002 | Trell | |
| 6,401,118 B1 | 6/2002 | Thomas | |
| 6,405,243 B1 | 6/2002 | Nielsen | |
| 6,412,014 B1 | 6/2002 | Ryan | |
| 6,421,675 B1 | 7/2002 | Ryan et al. | |
| 6,427,164 B1 | 7/2002 | Reilly | |
| 6,430,623 B1 | 8/2002 | Alkhatib | |
| 6,434,547 B1 | 8/2002 | Mishelevich et al. | |
| 6,438,583 B1 | 8/2002 | McDowell et al. | |
| 6,442,549 B1 | 8/2002 | Schneider | |
| 6,442,602 B1 | 8/2002 | Choudhry | |
| 6,449,657 B2 | 9/2002 | Stanbach, Jr. et al. | |
| 6,452,609 B1 | 9/2002 | Katinsky et al. | |
| 6,496,981 B1 | 12/2002 | Wistendahl et al. | |
| 6,502,131 B1 | 12/2002 | Vaid et al. | |
| 6,502,132 B1 | 12/2002 | Kumano et al. | |
| 6,505,201 B1 | 1/2003 | Haitsuka et al. | |
| 6,509,833 B2 | 1/2003 | Tate | |
| 6,510,461 B1 | 1/2003 | Nielsen | |
| 6,513,060 B1 | 1/2003 | Nixon et al. | |
| 6,519,589 B2 | 2/2003 | Mann et al. | |
| 6,526,402 B2 | 2/2003 | Ling | |
| 6,532,366 B1 | 3/2003 | Chung et al. | |
| 6,549,892 B1 | 4/2003 | Sansone | |
| 6,556,992 B1 | 4/2003 | Barney et al. | |
| 6,560,634 B1 * | 5/2003 | Broadhurst | 709/203 |
| 6,574,737 B1 | 6/2003 | Kingsford et al. | |
| 6,578,078 B1 | 6/2003 | Smith et al. | |
| 6,591,291 B1 | 7/2003 | Gabber et al. | |
| 6,594,697 B1 | 7/2003 | Praitis et al. | |
| 6,603,844 B1 | 8/2003 | Chavez, Jr. et al. | |
| 6,604,132 B1 | 8/2003 | Hitt | |
| 6,604,241 B1 | 8/2003 | Haeri et al. | |
| 6,605,120 B1 | 8/2003 | Fields et al. | |
| 6,606,659 B1 | 8/2003 | Hegli et al. | |
| 6,608,891 B1 | 8/2003 | Pelletier et al. | |
| 6,611,803 B1 | 8/2003 | Furuyama et al. | |
| 6,615,237 B1 | 9/2003 | Kyne et al. | |
| 6,615,247 B1 | 9/2003 | Murphy | |
| 6,615,348 B1 | 9/2003 | Gibbs | |
| 6,618,697 B1 | 9/2003 | Kantrowitz et al. | |
| 6,618,726 B1 | 9/2003 | Colbath et al. | |
| 6,628,314 B1 | 9/2003 | Hoyle | |
| 6,636,854 B2 | 10/2003 | Dutta et al. | |
| 6,636,961 B1 | 10/2003 | Braun et al. | |
| 6,637,032 B1 | 10/2003 | Feinleib | |
| 6,650,877 B1 | 11/2003 | Tarbouriech et al. | |
| 6,654,741 B1 | 11/2003 | Cohen et al. | |
| 6,654,746 B1 | 11/2003 | Wong et al. | |
| 6,654,779 B1 | 11/2003 | Tsuei | |
| 6,658,573 B1 | 12/2003 | Bischof et al. | |
| 6,665,620 B1 | 12/2003 | Burns et al. | |
| 6,668,278 B1 | 12/2003 | Yen et al. | |
| 6,671,585 B2 | 12/2003 | Lof et al. | |
| 6,671,714 B1 | 12/2003 | Weyer et al. | |
| 6,671,738 B1 | 12/2003 | Rajchel et al. | |
| 6,674,993 B1 | 1/2004 | Tarbouriech | |
| 6,678,717 B1 | 1/2004 | Schneider | |
| 6,691,105 B1 | 2/2004 | Virdy | |
| 6,711,585 B1 | 3/2004 | Copperman et al. | |
| 6,718,321 B2 | 4/2004 | Birrell et al. | |
| 6,728,767 B1 | 4/2004 | Day et al. | |
| 6,735,585 B1 | 5/2004 | Black et al. | |
| 6,745,367 B1 | 6/2004 | Bates et al. | |
| 6,748,375 B1 | 6/2004 | Wong et al. | |
| 6,751,562 B1 | 6/2004 | Blackett et al. | |
| 6,751,606 B1 | 6/2004 | Fries et al. | |
| 6,760,746 B1 | 7/2004 | Schneider | |
| 6,760,770 B1 | 7/2004 | Kageyama | |
| 6,766,369 B1 | 7/2004 | Haitsuka et al. | |
| 6,779,178 B1 | 8/2004 | Lloyd et al. | |
| 6,799,201 B1 | 9/2004 | Lee et al. | |
| 6,826,617 B1 | 11/2004 | Ansell et al. | |
| 6,829,653 B1 | 12/2004 | Tout | |
| 6,836,805 B1 | 12/2004 | Cook | |
| 6,850,940 B2 | 2/2005 | Wesinger, Jr. et al. | |
| 6,880,007 B1 | 4/2005 | Gardos et al. | |
| 6,892,226 B1 | 5/2005 | Tso et al. | |
| 6,895,402 B1 | 5/2005 | Emens et al. | |
| 6,895,430 B1 | 5/2005 | Schneider | |
| 6,901,436 B1 | 5/2005 | Schneider | |
| 6,931,451 B1 | 8/2005 | Logan et al. | |
| 6,944,658 B1 | 9/2005 | Schneider | |
| 6,959,339 B1 | 10/2005 | Wu et al. | |
| 6,961,700 B2 | 11/2005 | Mitchell et al. | |
| 6,963,928 B1 | 11/2005 | Bagley et al. | |
| 6,973,505 B1 | 12/2005 | Schneider | |
| 6,981,023 B1 | 12/2005 | Hamilton et al. | |
| 6,990,678 B2 | 1/2006 | Zigmond | |
| 7,000,028 B1 | 2/2006 | Broadhurst et al. | |
| 7,003,442 B1 | 2/2006 | Tsuda | |
| 7,003,719 B1 | 2/2006 | Rosenoff et al. | |
| 7,010,568 B1 | 3/2006 | Schneider et al. | |
| 7,013,298 B1 | 3/2006 | De La Huerga | |
| 7,039,697 B2 | 5/2006 | Bayles | |
| 7,039,708 B1 | 5/2006 | Knobl et al. | |
| 7,069,323 B2 | 6/2006 | Gardos et al. | |
| 7,080,158 B1 | 7/2006 | Squire | |

(56) References Cited

U.S. PATENT DOCUMENTS

| | | |
|---|---|---|
| 7,089,194 B1 | 8/2006 | Berstis et al. |
| 7,120,236 B1 | 10/2006 | Schneider |
| 7,136,725 B1 | 11/2006 | Paciorek et al. |
| 7,136,932 B1 | 11/2006 | Schneider |
| 7,149,780 B2 | 12/2006 | Quine et al. |
| 7,188,138 B1 | 3/2007 | Schneider |
| 7,194,552 B1 | 3/2007 | Schneider |
| 7,225,249 B1 | 5/2007 | Barry et al. |
| 7,337,910 B2 | 3/2008 | Cartmell et al. |
| 7,359,987 B2 | 4/2008 | Stahura |
| 7,418,471 B2 | 8/2008 | King et al. |
| 7,472,160 B2 | 12/2008 | King et al. |
| 7,490,124 B2 | 2/2009 | King et al. |
| 7,543,026 B2 | 6/2009 | Quine et al. |
| 7,546,381 B2 | 6/2009 | Tout |
| 7,565,402 B2 | 7/2009 | Schneider |
| 7,606,858 B2 | 10/2009 | King et al. |
| 7,627,628 B2 | 12/2009 | King et al. |
| 7,752,260 B2 | 7/2010 | King et al. |
| 8,037,168 B2 | 10/2011 | Schneider |
| 8,224,994 B1 | 7/2012 | Schneider |
| 2001/0010032 A1 | 7/2001 | Ehlers et al. |
| 2001/0021947 A1 | 9/2001 | Kim |
| 2001/0047429 A1 | 11/2001 | Seng et al. |
| 2002/0010795 A1 | 1/2002 | Brown |
| 2002/0016174 A1 | 2/2002 | Gibson et al. |
| 2002/0023034 A1 | 2/2002 | Brown et al. |
| 2002/0024424 A1 | 2/2002 | Burns et al. |
| 2002/0059161 A1 | 5/2002 | Li |
| 2002/0065903 A1 | 5/2002 | Fellman |
| 2002/0069200 A1 | 6/2002 | Roy et al. |
| 2002/0069378 A1 | 6/2002 | McLellan et al. |
| 2002/0073233 A1 | 6/2002 | Gross et al. |
| 2002/0091703 A1 | 7/2002 | Bayles |
| 2002/0091827 A1 | 7/2002 | King et al. |
| 2002/0091836 A1 | 7/2002 | Moetteli |
| 2002/0103745 A1 | 8/2002 | Lof et al. |
| 2002/0129013 A1 | 9/2002 | Thomas |
| 2002/0156800 A1 | 10/2002 | Ong |
| 2002/0188699 A1 | 12/2002 | Ullman et al. |
| 2002/0194113 A1 | 12/2002 | Lof et al. |
| 2003/0009592 A1 | 1/2003 | Stahura |
| 2003/0014450 A1 | 1/2003 | Hoffman |
| 2003/0074672 A1 | 4/2003 | Daniels |
| 2003/0088708 A1 | 5/2003 | Lewallen |
| 2003/0098375 A1 | 5/2003 | Shiga et al. |
| 2003/0182447 A1 | 9/2003 | Schilling |
| 2003/0225670 A1 | 12/2003 | DeCarlo, III |
| 2004/0030759 A1 | 2/2004 | Hidary et al. |
| 2004/0044791 A1 | 3/2004 | Pouzzner |
| 2004/0088083 A1 | 5/2004 | Davis et al. |
| 2004/0107025 A1 | 6/2004 | Ransom et al. |
| 2005/0055306 A1 | 3/2005 | Miller et al. |
| 2005/0102354 A1 | 5/2005 | Hollenbeck et al. |
| 2005/0235031 A1 | 10/2005 | Schneider |
| 2006/0190623 A1 | 8/2006 | Stahura |
| 2006/0265516 A1 | 11/2006 | Schilling |
| 2008/0005342 A1 | 1/2008 | Schneider |
| 2008/0010365 A1* | 1/2008 | Schneider ............... 709/223 |
| 2008/0016142 A1 | 1/2008 | Schneider |
| 2008/0016233 A1 | 1/2008 | Schneider |
| 2008/0059607 A1 | 3/2008 | Schneider |
| 2008/0235383 A1 | 9/2008 | Schneider |

FOREIGN PATENT DOCUMENTS

| | | |
|---|---|---|
| JP | 11184667 | 7/1999 |
| JP | 11242682 | 9/1999 |
| JP | 11296428 | 10/1999 |
| WO | 9909726 | 2/1999 |
| WO | 9922488 | 5/1999 |
| WO | 9939275 | 8/1999 |
| WO | 0007133 | 2/2000 |

OTHER PUBLICATIONS

O'Neil, E.; Cumulative Totals of No-Touch, Restricted Maintenance Operations, Alert, Warning, Emergency and Power Watch Notices Issued from 1998 to Present; California Independent System Operator (CAISO); May 29, 2003; USA; p. 4, Table; p. 5, Table; p. 6, Table; p. 7, Table; p. 8, Table; p. 9, Table; p. 10, Table; p. 11, Table; p. 11, Table; p. 12, Table; p. 14, Table.

Perez, Pena, R.; Utility Could Have Halted '03 Blackout, Panel Says; New York Times; http:--www.nytimes.com-2004-0406-national-06BLAC.html; Apr. 6, 2004; USA; paragraphs 1, 2, 3, 4, 9.

Purdum, T.; Statewide Blackouts Ordered as Heat Strains California Grid; New York Times; May 8, 2001; USA; paragraphs 3, 4, 5, 8, 9.

Schmid, E., McCorkle, S., O'Neil, E.; ISO Electric Emergency Notification: Memorandum; California Independent System Operator (CAISO); May 17, 2001; USA; p. 1, paragraphs 1 & 4; p. 2, paragraphs 1, 2, 3; p. 3; p. 4, paragraph 4 & 5; p. 5; p. 6, paragraph 1, p. 7; p. 8.

United States of America, Federal Energy Regulation Commission; National Transmission Grid Study, Consolidated List of Recommendations; FERC; May 6, 2002, USA; pp. 2-76 & 3-77 Section 4, 5-79 Section 5.

Weiss, J.; EPRI's Enterprise Infrastructure EPRI's Enterprise Infrastructure Security (EIS) Program Security (EIS) Program; Jul. 7, 2000; USA; pp. 2 through 24.

Weller, G.H.; A Case Study Review of Technical and Technology Issues for Transition of a Utility Load Management Program to Provide System Reliability Resources in Restructured Electricity Markets; LBNL-52408; Ernest Orlando Lawrence Berkeley National Laboratory; http:-certs.lbl.gov-; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.

Werst, K.L., Why Rotating Outages?; California Independent System Operator (CAISO); Aug. 17, 2001; USA; paragraphs 1, 2, 3, 5, 6, 7.

Donaghy, Melanie, "Wines & Vines," Sep. 1997, vol. 78, No. 9, p. 39(6).

Fax-Phone Switch for Multi-Ring Telephone Lines; Derwent Abstract; Jul. 1992.

"What does your phone number spell?" Internet print-out of www.phonespell.com; Wayback Machine.

"What Words are Hiding in Your Phone Number?" Internet print-out of www.dialabc.com; Wayback Machine.

Courter, Gini; Microsoft Office 2000 Professional Edition, 1999, Sybex, pp. 92-96, 254-257.

www.phonetic.com; Internet print-out; Wayback Machine.

Berners, T. et al., Network Working Group, Uniform Resource Identifiers (URI): General Syntax, Aug. 1988.

Web Page of Network Solutions.

Oakes, Chris, "Net Sol, ICANN Reach Accord," Wired News, from wired.com-news-politics-0,1283,31557,00.html, Sep. 29, 1999, pp. 1-3.

Singhal, Vigyan and Smith, Alan Jay, "Analysis of locking behavior in three real database systems," 1997, The VLDB Journal, vol. 6, pp. 40-52.

Desmond, J.; Customer Centric Alert and Resposne Program Overview; California Independent System Operator (CAISO); May 24, 2001; USA; pp. 2, 3, 4, 5, 6, 12, 13, 17, 18.

Goldman, C.A.; Kintner-Meyer, M.; Heffner, G.; Do "Enabling Technologies" Affect Customer Performance in Price-Responsive Load Programs?; LBNL-50328; Ernest Orlando Lawrence Berkeley National Laboratory; http:-eetd.lbl.gov-EA-EMP-; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.

Graves, K.; CAISO Summer 2001 Assessment; California Independent System Operator (CAISO); Mar. 22, 2001; USA; p. 29, paragraphs 1 & 2, p. 30, paragraphs 1, 2, Figure III-E.

(56) References Cited

OTHER PUBLICATIONS

Graves, K.; CAISO Feb. 2001 Winter Assessment and Summer 2001 Post-season Summary; California Independent System Operator (CAISO); Oct. 8, 2001; USA; pp. 17 & 18, Section IV.
Gross, G.; FCC moves ahead with powerline broadband rules; IDG News Service; Feb. 13, 2004; USA; paragraphs 1, 2, 6, 9.
Guardino; Board of Governors; Notification Plan 2; California Independent System Operator (CAISO); May 21, 2001; USA.
Helman, C., For years electric companies have dreamed of making their wires the high-speed data pipe to your PC. One tech company may yet make the dream possible.; Forbes.com; Jan. 20, 2003; USA; paragraphs 1, 2, 3, 4, 5.
Jonker, R.; Dijak, P.; Enabling Distributed Generation and Demand Response with Enterprise Energy-Management Systems; Darnell. com Inc.; May 17, 2001; USA; p. 1, paragraphs 1 & 2; p. 2, paragarphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.
Keoni, A.; California Independent System Operator Load Program Participants; California Independent System Operator (CAISO); Apr. 8, 2002; pp. 1, 2, 3.
Keoni, A.; Implementation Plan and Required Information for the Partipating Load Program (PLP); California Independent System Operator (CAISO); Aug. 8, 2002; USA; p. 1, paragraphs 2 & 3; p. 2, paragraphs 1 & 2, Table 1.
Labaton, S., F.C.C. Begins Rewriting Rules on Delivery of the Internet; Associated Press; Feb. 13, 2004; USA; paragarphs 1, 2, 6, 7.
Lyon, D.; The Development of Electric System Emergencies and the Emergency Response Communication Network: White Paper; California Independent System Operator (CAISO); Jun. 20, 2001; USA; p. 2, paragraphs 1 & 4; p. 3, paragraph 1 & Section II; pp. 6, 7, 8, 9; p. 10, Section III, paragraphs 1, 2, 3; pg. 11, paragraphs 2 & 3; p. 12, paragraph 1; p. 13, paragraph 4, p. 14.
Motegi, N., Piette, MA.; Web-based Energy Information Systems for Large Commercial Buildings; Ernest Orlando Lawrence Berkely National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.
Norman, J.; Southern Telecom and Main.net Announce Successful Demonstration of Broadband over Power Lines; Southern Telecom; Dec. 2003; p. 1.
Schneider, Eric; Claims from Pending U.S. Appl. No. 10/711,834.
Schneider, Eric; Claims from Pending U.S. Appl. No. 11/952,105.
Schneider, Eric; Claims from Pending U.S. Appl. No. 12/044,804.
Schneider, Eric; Claims from Pending U.S. Appl. No. 12/109,608.
Ohta, "Incremental Zone Trasfer in DNS", RFC 1995, Aug. 1996.
Vixie et al., "Dynamic Updates in the Domain Name System (DNS Update)", RFC 2136, Apr. 1997.
Berners-Lee, T.; Universal Resource Identifiers in WWW-A Unifying Syntax for the Expression of Names and Addresses of Objects on the Network as used in the World Wide Web; Network Working Group, Request for Comments 1630; IETF, Jun. 1994; http:-www.faqs.org-rfcs-rfc1630.html.
Cabell, D., Name Conflicts; Learning Cyberlaw in Cyberspace; Berkman Center for Internet & Society, Harvard Law Schol, Aug. 1999, pp. 1-21.
Cooper, A et al; The US Domain; Network Working Group, Request for Comments: 1480, Jun. 1993; pp. 1-47.
Goodin, D., CNET News.com: NSI confirms database revisions, Jan. 21, 1999, pp. 1-2.
Goodin, D., CNET News.com: NSI domain slowdown persists, Jan. 1999, pp. 1-4.
Harrenstien, et al.; RFC 954: Nicname-Whois , IETF, Oct. 1985, http:-ww.faqs.org-rfcs-rfc954.html.
Hollenbeck et al., Domain Name System Wildcards in Top-Level Domain Zones , VeriSign Naming and Directory Services, VeriSign, Inc., Sep. 9, 2003.
Liberto, S.M., Domain Name Conflicts: Hey! That s My.Com!, WWWiz Magazine, Mar. 1998, pp. 1-3.
Mockapetris P., RFC 1035: Domain Names-Implementation and Specification , IETF, Nov. 1987, http://www.faqs.org-rfcs-rfc1035.html.
Mockapetris, Domain Names-Concepts and Facilities , RFC 1034, Nov. 1987.
Northrup, Tony; "Domain Name Services"; NT Network Plumbing: Routers, Proxies, and Web Services; Jul. 1998; pp. 99-141; IDG Books Worldwide, Inc.; Foster City, Califorrnia.
Samson, M., PGMedia, Inc. d-b-a Name.Space TM, v. Network Solutions, Inc., et al., Mar. 1999, pp. 1-2.
Sollins, K; Architecture Principles of Uniform Resource Name Resolution, Network Working Group Request for Comments 2276; Jan. 1998; pp. 1-24.
Berners-Lee et al., Network Working Group, Uniform Resource Identifiers (URI): General Syntax, Xerox Corporation, http:-www.ietf.org-rfc-rfc2396.txt 8-98.
Press Release, "OINGO Pioneers New Domain Name Variation Technology", May 17, 2000; http:-www.namingsolutions.com-ns__new__pr__51700.hmtl.
Statement of the policy oversign committee, The Economic Structure of Internet Generic Top-Level Domain Name Registries Analysis and Recommendations, Jul. 23, 1998.
Crow, R., the Telephone Exchange Name Project, Web Site (1998), from http:-ourwebhome.com-TENP-TENproject.html.
NTIA-DOC, Improvement of Technical Management of Internet Names and Addresses, Federal Register V63 N34, Feb. 20, 1998, from http:-www.ntia.doc.gov-ntiahome-domainname-022098fedreg.httm.
NTIA-DOC, RFC on the enhancement of the .us Domain Space, Aug. 4, 1998, from http:-www.ntia.doc.gov-ntiahome-domainname-usrfc-dotusrfc. htm.
Wired News Report, The Postal Proposal, Wired News, May 8, 1999 from http:-www.wired.com-news-technology-0,1282.131-30,00.html.
Wired News Report, Depp Space Web?, Wired News, Jul. 22, 1999 from http:-www.wired.com-news-technology-0,1282,139-09,00.html.
Oakes, C., Internet Keywords Patent Spat, Wired News, Jul. 22, 1999 from http:-www.wired.com-news-technology-0,1282,13892.00html.
Perez, Juan Carlos, Mozilla Launches Firefox 1.0, PCWORLD.com, Nov. 9, 2004 <http:-www.pcworld.com-news-article-0,aid,118537,00.asp>.
Advanced Control Systems, Inc.; Load Management; Advanced Control Systems, Inc.; Jun. 20, 2001 (Aug. 1999); USA; p. 1, paragraph 1; p. 2, paragraphs 1, 2, 3; p. 3, paragraphs 1 & 2; p. 4, paragraphs 1 & 2.
American City Business Journal, Inc.; Blackout early warnings mandated; Apr. 3, 2001; USA; paragraphs 1, 2, 5, 6.
Bradley, J.; ISO Blackout Notice Plan Follow-Up; Silicon Valley Manufacturers Group & California Independent System Operator (CAISO); May 8, 2001; p. 1, paragraphs 1, 2, 3, 4; p. 2, paragraphs 1, 3, 4.
California, State of; Energy Action Plan; May 20, 2003; USA; p. 5, Section 1; pp. 7 & 8 Section V.
California Independent System Operator; California Independent System Operator Participant's whom have entered into an Interruptible Service Contract or similar agreement; California Independent System Operator (CAISO); Dec. 10, 2002; p. 1.

\* cited by examiner

From 242 or 250 or 260
Network resource
accessible? - No

↓

Process registration
request from at least
a portion of URI — 410

↓

End

*Fig. 4a*

From 242 or 250 or 260
Network resource
accessible? - No

↓

Error message including
hyperlink(s) to perform a
WHOIS request and/or process
a registration request — 415

↓

End

*Fig. 4b*

From 410
Process registration
request from at least a
portion of URI

↓

430
Search input? — Yes → Process as search request — 218

↓

Provide results if any — 222

No ↓ ←

End

Determine if search request is processed
420

*Fig. 4c*

```
; The use of the Data contained in Network Solutions' aggregated
; .com, .org, and .net top-level domain zone files (including the checksum
; files) is subject to the restrictions described in the access Agreement
; with Network Solutions.

NET. IN    SOA    A.ROOT-SERVERS.NET. hostmaster.nsiregistry.net. (
           2000090600 ;serial
           1800 ;refresh every 30 min
           900 ;retry every 15 min
           604800 ;expire after a week
           86400 ;minimum of a day
           )
NET. 518400 IN NS A.ROOT-SERVERS.NET.
NET. 518400 IN NS E.GTLD-SERVERS.NET.
NET. 518400 IN NS F.GTLD-SERVERS.NET.
NET. 518400 IN NS F.ROOT-SERVERS.NET.
A.ROOT-SERVERS.NET. 518400 IN A 198.41.0.4
E.GTLD-SERVERS.NET. 518400 IN A 207.200.81.69
F.GTLD-SERVERS.NET. 518400 IN A 198.17.208.67
F.ROOT-SERVERS.NET. 518400 IN A 192.5.5.241
GLOBALMAILING.NET. 172800 IN NS NS.DANDY.NET.
GLOBALMAILING.NET. 172800 IN NS NS.WJSE.COM.
DIFFERANCE-ENGINE.NET. 172800 IN NS NAPLES.NETWIDE.NET.
DIFFERANCE-ENGINE.NET. 172800 IN NS ROME.NETWIDE.NET.
YOUTHPIECE.NET. 172800 IN NS NS1.AOSOFT.COM.
YOUTHPIECE.NET. 172800 IN NS NS2.AOSOFT.COM.

; Add wildcards to redirect all otherwise unresolvable .NET Names
; to a market driven registration site such as REGISTRARPORTAL.COM
; use 2 lines to point to a DN and glue record for IP address
                                                              830
*. 172800 IN NS REGISTRARPORTAL.COM. ⟋
REGISTRARPORTAL.COM. 172800 IN A 123.45.67.89
; or could simply have one line
; *. 172800 IN A 123.45.67.89
; or
; * 172800 IN A 123.45.67.89
```

*Fig. 8b*

UNames Identifier Registration Form

Congratulations!! example.com is available for registration.   930
Please provide your Registrant information by clicking here!

Below is a list of other identifiers that are currently available.
Please select which identifiers that you would like to register.

```
 X    example.com
___   example.sitemap
 X    example.411
___   example.news      935
 X    exampleco
___   1-800-example
```

Please provide any keywords or descriptors that you would like to put in your watch list so that we may be able to inform you of any available identifiers that may become available in the future.

By using the watch list you may also stay current on what identifiers your competition may be registering.

Enter the identifiers that are registered by your competitors and enter any geographic, psychographic, and/or demographic information here including any keywords of interest for yourself and your competition.

940
News
Stories

945

Click here to receive any suggested identifiers based on your registrant information and/or any selected categories of interest to help make your watch list selection.

( Submit )   ( Reset )

*Fig. 9b*

```
<html><body>
<pre>
Registrant:
Internet Assigned Numbers Authority (<A href="whois?EXAMPLE-DOM">EXAMPLE-DOM</A>)
4676 Admiralty Way, Suite 330                                              965
Marina del Rey, CA <a href="http://tlda.com/cgi-bin/map.cgi?zip=90292">90292</a>)
US Domain Name: <a href="http://www.example.com">EXAMPLE.COM</a>    960

Administrative Contact, Technical Contact, Zone Contact:
    Internet Assigned Numbers Authority  (<A href="whois?IANA">IANA</A>)  iana@IANA.ORG
    <a href="tel:+13108239358">310-823-9358</a>              970
    <a href="fax:+13108238649">Fax- 310-823-8649</a>

Record last updated on 14-Jun-99.
Record created on 14-Aug-95.
Database last updated on 11-Aug-99 03:52:52 EDT.

Domain servers in listed order:
VENERA.ISI.EDU          <A href="whois?128.9.176.32">128.9.176.32</A>
NS.ISI.EDU              <A href="whois?128.9.128.127">128.9.128.127</A>
</pre>                                                                      980
<a href="http://backorder.com/cgi-bin/backorder.cgi?dn=example.com">Back Order EXAMPLE.COM</A><BR>
<a href="http://tlda.com/cgi-bin/auction.cgi?dn=example.com">Aftermarket information for EXAMPLE.COM</A>
</body></html>                                                              975
```

*Fig. 9c*

METHOD, PRODUCT, AND APPARATUS FOR REQUESTING A NETWORK RESOURCE

CROSS REFERENCE TO RELATED APPLICATIONS

This application is a continuation of U.S. patent application Ser. No. 09/682,133 filed Jul. 25, 2001 entitled "Method, product, and apparatus for requesting a network resource", now U.S. Pat. No. 7,194,552, which is a continuation-in-part of U.S. patent application Ser. No. 09/525,350 filed Mar. 15, 2000 entitled "Method, product, and apparatus for requesting a network resource", now U.S. Pat. No. 6,338,082, which claims the benefit of: U.S. Provisional Application Ser. No. 60/175,825 filed Jan. 13, 2000; U.S. Provisional Application Ser. No. 60/160,125 filed Oct. 18, 1999; U.S. Provisional Application Ser. No. 60/157,075 filed Oct. 1, 1999; U.S. Provisional Application Ser. No. 60/130,136 filed Apr. 20, 1999. and U.S. Provisional Application Ser. No. 60/125,531 filed Mar. 22, 1999.

FIELD OF THE INVENTION

This invention generally relates to network navigation, and more specifically relates to a method, product, and apparatus for requesting a network resource.

DESCRIPTION OF THE RELATED ART

The Internet is a vast computer network having many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide data and a client computer may display or process it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Web browsers, such as Microsoft Internet Explorer (MSIE), Netscape Navigator, and NeoPlanet provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side web browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which can be used as a query to access a database server and generate an HTML web page with customized data results as output that is passed back to the client browser for display.

There are many network access devices and program products that primarily serve as a navigation tool allowing a user to request network resources from resource identifiers. Navigating to a different network resource could happen as a result of external automation, internal automation from a script, the user clicking a hyperlink or typing in the address bar or location field of web browser, for example. All too often, such navigation tools can not always successfully access a network resource from an identifier for many reasons. Some reasons may include: domain name can not be translated into an IP address, invalid syntax, access denied, payment required, request forbidden, object not found, method is not allowed, no response acceptable to client found, proxy authentication required, server timed out waiting for request, user should resubmit with more info, resource is no longer available, server refused to accept request without a length, precondition given in request failed, network resource identifier is too long, unsupported media type, retry after doing the appropriate action, internal server error, server does not support the functionality required to fulfill the request, error response received from gateway, temporarily overloaded, timed out waiting for gateway, attempt to redirect the navigation failed, and HTTP version not supported. In any event, a status message is usually displayed indicating that the network resource request has failed.

A network resource identifier such as a Uniform Resource Identifier (URI) is a compact string of characters for identifying an abstract or physical resource such as a network resource. URIs are the generic set of all names and addresses that refer to objects on the Internet. URIs that refer to objects accessed with existing protocols are known as Uniform Resource Locators (URLs). A URL is the address of a file accessible on the Internet. The URL includes the name of the protocol required to access the resource, a domain name, or IP address that identifies a specific computer on the Internet, and a hierarchical description of a file location on the computer. For example the URL "http://www(dot)example(dot)com/index(dot)html", where "http" is the scheme or protocol, "www(dot)example(dot)com" is the Fully Qualified Domain Name (FQDN), and "index(dot)html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use e-mail and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

The DNS provides a mechanism so backup databases can be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network. The function of translating a domain name into an IP address is known as name resolution. Name resolution is performed by a distributed system of name servers having resolvers to fulfill the resource request of the client by the successive hierarchical querying of the resource records from zone files.

The Berkeley Internet Name Domain (BIND) implements an Internet name server for the UNIX operating system. The BIND includes a name server and a resolver library. BIND is fully integrated into UNIX network programs for use in storing and retrieving host names and addresses by calling a routine from the resolver library called gethostbyname( )which returns the IP address corresponding to a given Internet host name. Error return status from gethostbyname( )is indicated by return of a NULL pointer.

At the heart of Netscape client products lies the Netscape Network Library (NETLIB). A necessity of any network based client browser application is to send and receive data over a connection. This is accomplished in NETLIB by making a call to NET_GetURL( ) In order to resolve host names, NETLIB uses a standard DNS lookup mechanism. NET_FindAddress( ) makes the gethostbyname( ) call to lookup the IP address for the specified host from a DNS database stored on a DNS server, and is called from NET_BeginConnect( ) If a numeric IP address is passed into NET_FindAddress( ) it is passed directly into the gethostbyname( ) call which returns a success when an IP address is passed in. NET_FindAddress( ) is actually called repeatedly until it returns success or failure. Similarly, MSIE browser include objects such as WebBrowser Object and InternetExplorer Object, which contains events, methods, and properties. One event, called the Navigate Event navigates to a resource identified by a URL.

A domain name includes two parts: a host and a domain. Technically, the letters to the right of the "dot" (e.g., tut(dot)net) are referred to as Top Level Domains (TLDs), while hosts, computers with assigned IP addresses that are listed in specific TLD registries are known as second-level domains (SLDs). The domain name, "tlda(dot)com", "(dot)com" is the TLD, and "tlda" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "news(dot)tlda(dot)com", are subsidiary to TLDs in the hierarchy of the Internet's DNS.

There are two types of top-level domains, generic and country code. Generic top-level domains (gTLDs) are used to allocate resources to the growing community of institutional networks, while country code top-level domains (ccTLDs) are used use by each individual country, as deemed necessary. More than 240 national, or country-code TLDs (e.g., United States ((dot)us), japan ((dot)jp), Germany ((dot)de), etc.) are administered by their corresponding governments. A small set of gTLDs does not carry any national identifier, but denote the intended function of that portion of the domain space. For example, "(dot)com" was established for commercial networks, "(dot)org" for not-for-profit organizations, and "(dot)net" for network gateways. The set of gTLDs was established early in the history of the DNS and has not been changed or augmented in recent years (COM, ORG, GOV, and MIL were created by January 1985, NET in July 1985, and INT was added in November 1988).

Incorporated and headquartered in California, the Internet Corporation for Assigned Names and Numbers (ICANN) is the non-profit corporation that was formed to take over responsibility for the IP address space allocation, protocol parameter assignment, domain name system management, and root server system management functions now performed under U.S. Government contract by Internet Assigned Numbers Authority (IANA) and other entities. The IANA, also headquartered in California, is the overall authority for day-to-day administration of the DNS. IANA staff carry out administrative responsibilities for the assignment of IP Addresses, Autonomous System Numbers, TLDs, and other unique parameters of the DNS and its protocols.

By Jun. 1, 1999, Network Solutions (NSI) Registry (now Verisign) had implemented a shared registration system (SRS) to support multiple licensed, accredited registrars offering registration services. NSI and other domain name registrars function as retailers of domain name registration services through NSI's SRS. To date, more than 20,000,000 domain names, or SLDs, in "(dot)com", "(dot)net", "(dot)org", and "(dot)edu" have been registered.

VeriSign Global Registry Services (GRS) is the leading provider of domain name registry services and DNS support to the Internet and is responsible for the infrastructure that propagates this information throughout the Internet and responds to over 1.5 billion DNS look-ups daily. The Registry stores information about registered domain names and associated name servers. A domain name's data includes its name, name servers, registrar, registration expiration date, and status. A name server's data includes its server name, IP addresses, and registrar.

As explained in S. Hollenbeck, et. al, "Informational RFC (Request for Comment) 2832: NSI Registry Registrar Protocol (RRP) Version 1.1.0", Internet Engineering Task Force (IETF), May 2000, "http://www(dot)faqs(dot)org/rfcs/rfc2832(dot)html", VeriSign GRS has developed a registration protocol for use within the SRS. Internet domain name registration typically involves three entities: a registrant who wishes to register a domain name, a registrar who provides services to the registrant, and a registry that provides services to the registrar while serving as the authoritative repository of all functional information required to resolve names registered in the registry's TLDs.

A Registrar may access the Registry via RRP to perform registration service procedures such as determining if a domain name has been registered, registering a domain name, renewing the registration of a domain name, canceling the registration of a domain name, updating the name servers of a domain name, transferring a domain name from another registrar, examining or modifying the status of domain names that the registrar has registered, determining if a name server has been registered, registering a name server, updating the IP addresses of a name server, deleting a name server, and examining the status of name servers that the registrar has registered.

Domain name registration for a given NIC authority can be accessed by a TCP/IP application called WHOIS, which queries a NIC database to find the name of network and system administrators, system and network points-of-contact, and other individuals who are registered in appropriate databases. Domain names are identifiers used for both accessing a resource and retrieving contact information of the registrant or domain name holder of that resource. The availability of a domain name from a NIC authority for a given TLD is determined by submitting a WHOIS request. If there are no matches in the database then the domain name may be available for registration. Regional WHOIS registries are maintained by NSI and ARIN (American Registry for Internet Numbers) located in the U.S., APNIC (Asia-Pacific Network Information Center) located in Australia, and RIPE NCC located in the Netherlands. Domain name resolution is determined by resolving a query in the DNS and domain name availability is determined by using the RRP or WHOIS service to query an appropriate NIC database.

WIPO Patent Application WO9909726A1 published on Feb. 25, 1999 by Broadhurst, entitled, "Method of determining unavailability of Internet domain names" discloses an improved query server that overcomes the shortcomings of existing domain name searching techniques by performing a multitude of searches simultaneously, transparent to the user. Specifically, the improved query server searches for existing domain name records in various domains and then displays the results in a formatted manner, thus eliminating the need for a user to perform individual searches. However, such improvements do not consider the integration of services other than that of domain name registration.

URLs are used in media, documents, e-mail, and data files, etc. as a means to make reference to accessible online content that can express the context of ideas may wish to communicate. URLs are generally written in an abbreviated manner as partial URLs or domain names (e.g., "http://www(dot)example(dot)com" is the URL, "www(dot)example(dot)com" is the FQDN, and "example(dot)com" is the domain name). During early stages of commercialization of the Internet, businesses displayed the full URL when advertising a commercial or display ad as a means to locate the resources of the business on the Internet. Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example(dot)com" or "www(dot)example(dot)com" instead of the URL "http://www(dot)example(dot)com".

The "www" in "www(dot)example(dot)com" has become the de facto standard for web server software to connect with hosts on the World Wide Web portion of the Internet. However, in an effort to shorten the URL length both in advertising and as a means of input, a DNS resource record has been used to create aliases for the actual FQDN. The CNAME Record are sometimes called "aliases" but are technically referred to as "Canonical Name" (CNAME) entries. These records enable the use of pointing more than one domain name to a single host. Using canonical names makes it easy to host both an FTP server and a Web server on the same machine. The CNAME record "example(dot)com. IN CNAME www(dot)example(dot)com." enables a domain name to become an alias of a FQDN. This alias allows resolvers to process input such as "http://example(dot)com" to resolve to a web server corresponding to the URI "http://www(dot)example(dot)com".

As explained in P. Mockapetris, "Informational RFC (Request for Comment) 1034: DOMAIN NAMES—CONCEPTS AND FACILITIES", Internet Engineering Task Force (IETF), November 1987, "http://www(dot)faqs(dot)org/rfcs/rfc1034(dot)html", the principal activity of name servers is to answer standard queries. Both the query and its response are carried in a standard message format. A domain name identifies a node. Each node has a set of resource information, which may be empty. The set of resource information associated with a particular name is composed of separate resource records (RRs). The order of RRs in a set is not significant, and need not be preserved by name servers, resolvers, or other parts of the DNS.

RRs with owner names starting with the label "*" are called wildcard resource records. Wildcard RRs can be thought of as instructions for synthesizing RRs. When the appropriate conditions are met, the name server creates RRs with an owner name equal to the query name and contents taken from the wildcard RRs. The only example of wildcard RR usage in RFC 1034 is that of e-mail aliasing. Recently, ccTLD registries have used wildcard RRs to redirect a resolvable domain name back to the registrar component of the registry to perform registration requests. Performing this technique in a gTLD zone file would cause conflict enabling the Registry to bypass competition among multiple registrars in this very public component of the Internet's underlying technology. As a result a wildcard RR has never been used in a gTLD zone file.

The main use of a web browser location field is for resolving URLs to locate and access resources. Entering a URL into the location field of a web browser serves as a means to access a network resource corresponding to that URL. Because the location field is essential for accessing resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

URLs can be removed or made temporarily unavailable for numerous reasons. When a file is removed from a directory, the URL that represents the file location no longer exists and therefore can not be found. It is quite common for users to modify a URL by deleting the file portion as an attempt to access the default "index(dot)html" file from the same directory path. For instance, the URL "http://example(dot)com/first/second/file(dot)html" is not found, leaving the user to remove "file(dot)html" to try to access the modified URL, "http://example(dot)com/first/second/". If the modified URL is still not found, then the user manually repeats such steps with the hope that some level of access to the computer resource is successful.

Another location field improvement includes a reverse autocomplete feature to help automate the process of systematically attempting to access a related resource similar to that of the original requested resource. U.S. Pat. No. 6,041,324 issued on Mar. 21, 2000 by Earl, et al., entitled, "System and method for identifying valid portion of computer resource identifier" discloses a method for receiving and validating user input for a computer resource entered into a computing system or network, and distinguishing valid and invalid portions of the user input. The most specific portion of the invalid resource identifier is removed from the invalid resource identifier to create a modified resource identifier, wherein the modified resource identifier is used to attempt to access a higher-level computer resource. The fields corresponding to the most specific portion of the resource identifier are removed until the modified resource identifier proves to be a valid resource identifier, which can access a computer resource.

The '324 patent processes all input determined to be invalid as an error or mistake without consideration to the benefits of intentionally receiving invalid input for the purpose of resource location. Though the '324 patent distinguishes a valid resource identifier from within an invalid resource identifier entered by the user, no consideration is given to further using the invalid portion of the resource identifier for other purposes. The '324 patent treats the invalid identifier as if it was at one time valid. Modification of the resource identifier is only path specific and does not contemplate modifying the domain level or server portion of the resource identifier. Furthermore, such modification techniques are applied in only one direction which is to successively generate a higher level computer resource through truncation, and does not contemplate successively generating lower level computer resources through prepend or append procedures.

U.S. Pat. No. 5,978,817 issued on Nov. 2, 1999 by Giannandrea, et al., entitled, "Browser having automatic URL generation" discloses a method for accessing a remote server over a network using a browser from a URL that contains a protocol portion and a server portion. A front-end module of the browser allows a viewer to type in a host name and it can supply the complete URL address to locate the corresponding file from a remote server. For example, when a viewer types in "www(dot)foo(dot)com", the module causes NETLIB to open a connection using the following URL name: "http://www(dot)foo(dot)com/". Similarly, when a viewer types in "ftp(dot)foo(dot)com", "news(dot)foo(dot)com", or "gopher(dot)foo(dot)com", the module causes NETLIB to a open a connection using "ftp://dtp(dot)foo(dot)com", "news://news(dot)foo(dot)com/", or "gopher://gopher(dot)foo(dot)com/", respectively. This feature reduces the amount of typing by a viewer, thereby making the browser easier to use. Though the protocol portion that corresponds to the typed-in server portion is determined in response to the typed-in server portion, there is no mention of how to prepend lower level domains to a domain name in response to failing to access a network resource corresponding to the domain name.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "(dot)" are sent via HTTP to a server at "netscape(dot)com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "(dot)" versus " " is a key factor in determining what services are used. The detection of a "(dot)" implies a domain name for name resolution services whereas the detection of a " " implies a search request for directory services depending on context.

The autosearch feature of MSIE is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL cannot be constructed, the browser then automatically formats a search engine query using the user-entered text and forwards the query to an Internet search engine. In an alternative embodiment of the '459 patent, the passing of search terms to the search engine is not triggered by an improper URL being entered but rather is triggered by the failure to resolve the URL to a web site within a certain time frame due to a heavily used page that cannot be readily accessed.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo!search engine to be called is "http://msie(dot)yahoo(dot)com/autosearch?% s". The % s is filled in with information regarding the search terms.

RealNames Corporation provides a registry of registered keywords and phrases as an alternate means of resource location. Recently, Microsoft in alliance with RealNames has configured MSIE AutoSearch feature to redirect to a RealNames resolver/server in an attempt to find any registered keywords or phrases that match the search input entered into the browser. Currently, RealNames resolvers/servers do not perform the step of determining domain name availability nor the step of processing input in response to a DNS resolution error, but is used instead only as an alternative navigational tool in response to search requests.

Each day hundreds of thousands of users are connecting to the Internet for the first time. First time users are already familiar with the concept of a domain name or web address such as "example(dot)com" or a URL such as "http://www(dot)example(dot)com/index(dot)html" because of their contact with the myriad of advertisements in print, radio, and television. Because the navigation of network resources is left up to the user, it is quite often that a user may enter a descriptive word and concatenate a TLD such as "(dot)com" to it, forming a domain name with the hope of finding information relating to the descriptive word. When a resource such as a web page can not be accessed after entering a web address or URL in the command line of a device or location field of a web browser, novice users of the Internet may assume that the resource does not exist and that the domain name of such a resource is available to the user for registration. This is a common mistake. The domain name may be registered but has no corresponding web site. Availability of the domain name remains unclear until a separate domain name availability request such as a WHOIS or RRP request is performed. To date, there is knew no known system for using the location field of a web browser as a registration tool in addition to a navigation tool and search tool.

In effect, a domain name can be considered an object having the properties of resolvability and availability, wherein methods of resolvability are applied to resource identification and location services and methods of availability are applied to domain name registration services. To date, resource location and domain name availability have remained separate mutually exclusive services. Additional advantages can be obtained by integrating these separate services into a unified service. Accordingly, in light of the above, there is a strong need in the art for a system and method for integrating resource location and registration services.

SUMMARY OF INVENTION

The present invention enables the seamless integration between resource identification, name resolution, and registration services. The invention allows for the extended utility of the command line of a device or location field of a client browser for determining domain name availability to streamline the registration process. The present invention helps novice Internet users to more readily understand the difference between resource location and domain name availability. The invention may use zone file caching and advanced domain name translation lookups to reduce extra bandwidth required by relying on client name resolution services or WHOIS lookups only. The present invention enables various methods of registration provider selection by a user or at random each time a browser redirects to registration services, assuring that business is distributed to other registrars. The invention may use a template of the MSIE autosearch feature for the purposes of registration rather than purpose of searching in lieu of making browser modifications resulting in the savings of distribution costs for software updates.

The present invention may use a wildcard resource record having an IP address corresponding to a network resource adapted to determine which domain name registration provider of a plurality of domain name registration providers can process the registration request when it is determined that a domain name is available for registration. The invention can attempt to access a network resource by generating a resolvable subdomain from the initial domain name before potentially processing a registration request. The present invention may generate many identifiers such as keywords, fictitious domain names and the like in response to initiating a registration request from a network resource that can not be accessed/located or from an unresolvable domain name. The invention enables an autosearch to process any request other than that of a search request.

In general, in accordance with the present invention a method for processing a network resource request from an identifier having a first domain name includes the steps of determining that the network resource can not be accessed, and processing a registration request having at least a portion of the identifier.

In accordance with an aspect of the present invention, a method for requesting a network resource from an identifier having a valid domain name includes the steps of determining whether the network resource can be located, requesting the network resource from the identifier in response to determining that the network resource can be located, and processing a registration request in response to determining that the network resource can not be located.

In accordance with another aspect of the present invention, a method for locating a network resource from an identifier having a valid domain name includes the steps of determining whether the valid domain name is resolvable, resolving the identifier in response to determining that the valid domain name is resolvable, and processing a registration request in response to determining that the valid domain name is not resolvable.

In accordance with yet another aspect of the present invention, a method for processing an autosearch includes the steps of receiving a first request having an identifier, determining that at least a portion of the first request can not be processed, and processing a second request having at least a portion of the identifier from the autosearch wherein the second request is any request other than that of a search request (e.g., non-search request such as navigation request, resolution request, and registration request).

In accordance with other additional aspects of the present invention, an apparatus, device, system, and computer program product may be used to perform substantially the same methods as those described above are provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF DRAWINGS

FIG. 4a is a top-level flowchart illustrating the step performed of processing a registration request in response to the determination that a network resource can not be accessed or located or that a domain name is unresolvable in the preferred embodiment of the present invention.

FIG. 4b is a top-level flowchart illustrating the step performed of providing an error message in response to the determination that a network resource can not be accessed or located or that a domain name is unresolvable in accordance with the present invention.

FIG. 4c is a flowchart illustrating the steps performed for further integrating registration services with resource location services and search services in accordance with the present invention.

FIG. 8b presents an exemplary table in accordance with the present invention of a zone file having a wildcard resource record.

FIG. 9b is a flowchart illustrating an identifier registration form in accordance with the present invention.

FIG. 9c illustrates the page source of modified WHOIS output in accordance with the present invention.

DETAILED DESCRIPTION

Figure 1A:
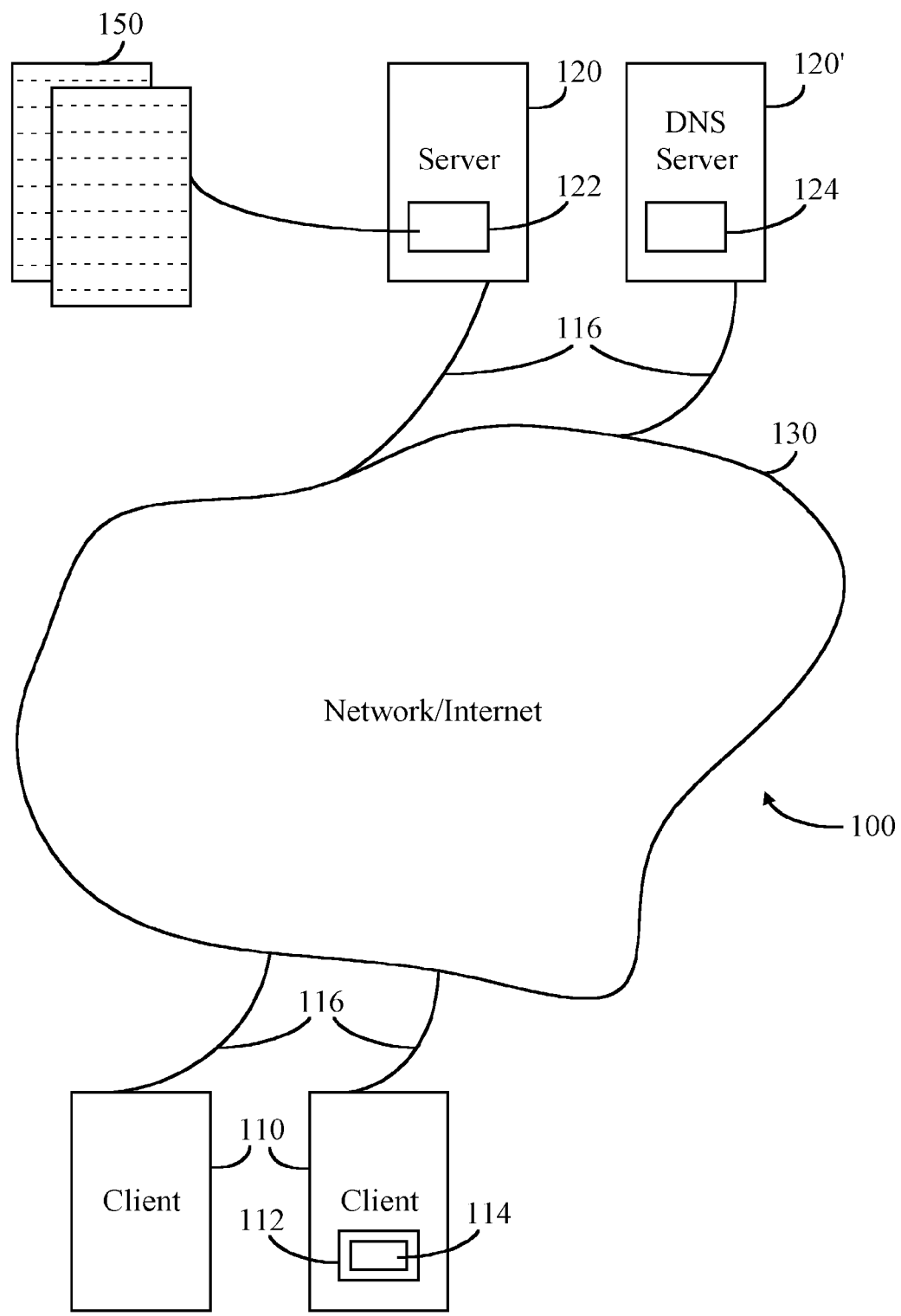
FIG. 1a is a block diagram of an exemplary distributed computer system in accordance with the present invention.

The present invention will now be described with reference to the drawings, wherein like reference numerals are used to refer to like elements throughout.

FIG. 1a illustrates an exemplary system for providing a distributed computer system 100 in accordance with one aspect of the present invention and may include client computers or any network access apparatus 110 connected to server computers 120 via a network 130. The distributed system 100 may include client computers or any network access apparatus 110 connected to server computers 120 via a network 130. The network 130 may use Internet communications protocols (IP) to allow clients 110 to communicate with servers 120. The communication device of a network access apparatus 110 may include a transceiver, a modem, a network interface card, or other interface devices to communicate with the electronic network 130. The network access apparatus 110 may be operationally coupled to and/or include a Global Positioning System (GPS) receiver. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may be accessed via an on-line service, an Internet service provider, a local area network service, a wide area network service, a cable television service, a wireless data service, an intranet, a virtual private network, a peer-to-peer network, a satellite service, or the like.

Client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors 166, memories 168, and input/output devices 170. An input device may be any suitable device for the user to give input to client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. One aspect of the present invention includes a specific type of server system 120 called a DNS server system 120' which stores in memory a DNS database 124 having DNS records that translate domain names into IP addresses and vice versa. The DNS server system 120' is connected 116 to a network 130.

The DNS is a distributed database (of mappings) 124 implemented in a hierarchy of DNS servers (name servers) 120' and an application-layer protocol that allows hosts and name servers to communicate in order to provide the translation service. Name servers 120' are usually UNIX machines running BIND software. In order to deal with an issue of scale of the Internet, the DNS uses a large number of name servers 120', organized in a hierarchical fashion and distributed around the world. No single name server 120' has all of the mappings 124 for all of the hosts in the Internet. Instead, the mappings 124 are distributed across many name servers 120'.

Although the client computers 110 are shown separate from the server computers 120, it should be understood that a single computer may perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced with Intranets and more generally in distributed environments in which a client computer requests resources from a server computer.

During operation of the distributed system 100, users of the clients 110 may desire to access information records 122 stored by the servers 120 while utilizing, for example, the Web. The records of information 122 can be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a Uniform Resource Identifier (URI) or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

A client of the DNS is called a resolver 114. Resolvers 114 are typically located in the application layer of the networking software of each TCP/IP capable machine. Users typically do not interact directly with the resolver 114. Resolvers 114 query the DNS by directing queries at name servers, which contain parts of the distributed database that is accessed by using the DNS protocols to translate domain names into IP addresses needed for transmission of information across the network. DNS is commonly employed by other application-layer protocols—including HTTP, SMTP and FTP—to translate user-supplied domain names to IP addresses. When a browser program 112 (e.g., an HTTP client), running on a user's machine, requests a URL having a resolvable domain name, in order for the user's machine to be able to send an HTTP request message to a server 120, the user's machine must obtain the IP address of the domain name. The user machine then runs the resolver 114 (DNS client) on the client-side of the DNS application. The browser 112 extracts the domain name from the URL and passes the domain name to the resolver 114 on the client-side of the DNS application. As part of a DNS query message, the DNS client 114 sends the domain name to a DNS server system 120' connected to the Internet. The DNS client 114 eventually receives a reply, which includes the IP address for the domain name. The browser then opens a TCP connection 116 to the HTTP server process 120 located at the IP address.

Figure 1B:
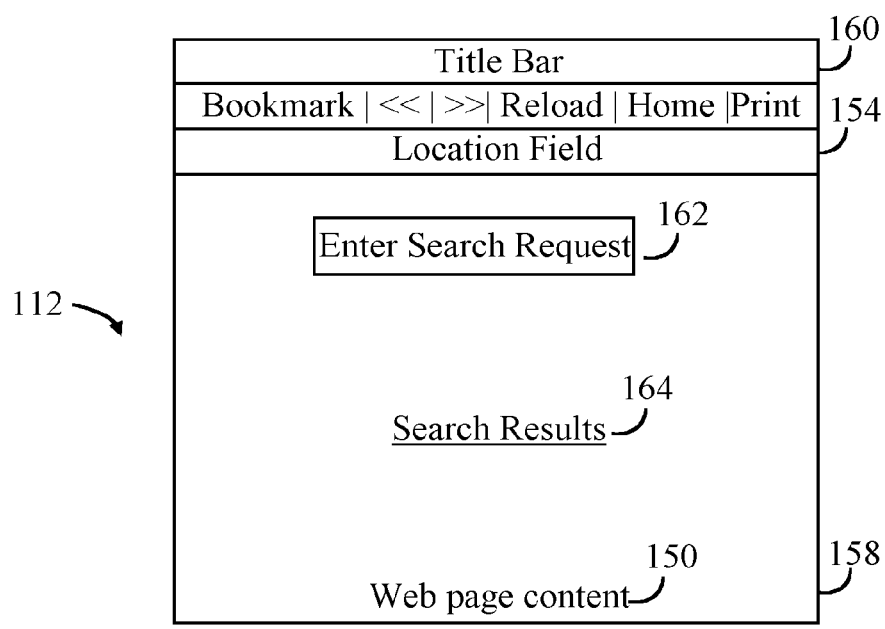
FIG. 1b is a diagram depicting the location field used in a conventional web browser.

FIG. 1b more specifically illustrates an exemplary selection of common operative components of a web browser program 112. The web browser 112 enables a user to access a particular web page 150 by typing the URL for the web page 150 in the location field 154. The web page 150 content corresponding to the URL from the location field 154 may be displayed within the client area of the web browser display window 158, for example. Title information from the web page 150 may be displayed in the title bar 160 of the web browser 112. The web page 150 content may further include a user interface element such as that of an input text box 162 for inputting search requests and, in turn, search results having identifiers 164 such as a hyperlink or URL.

Figure 1C:
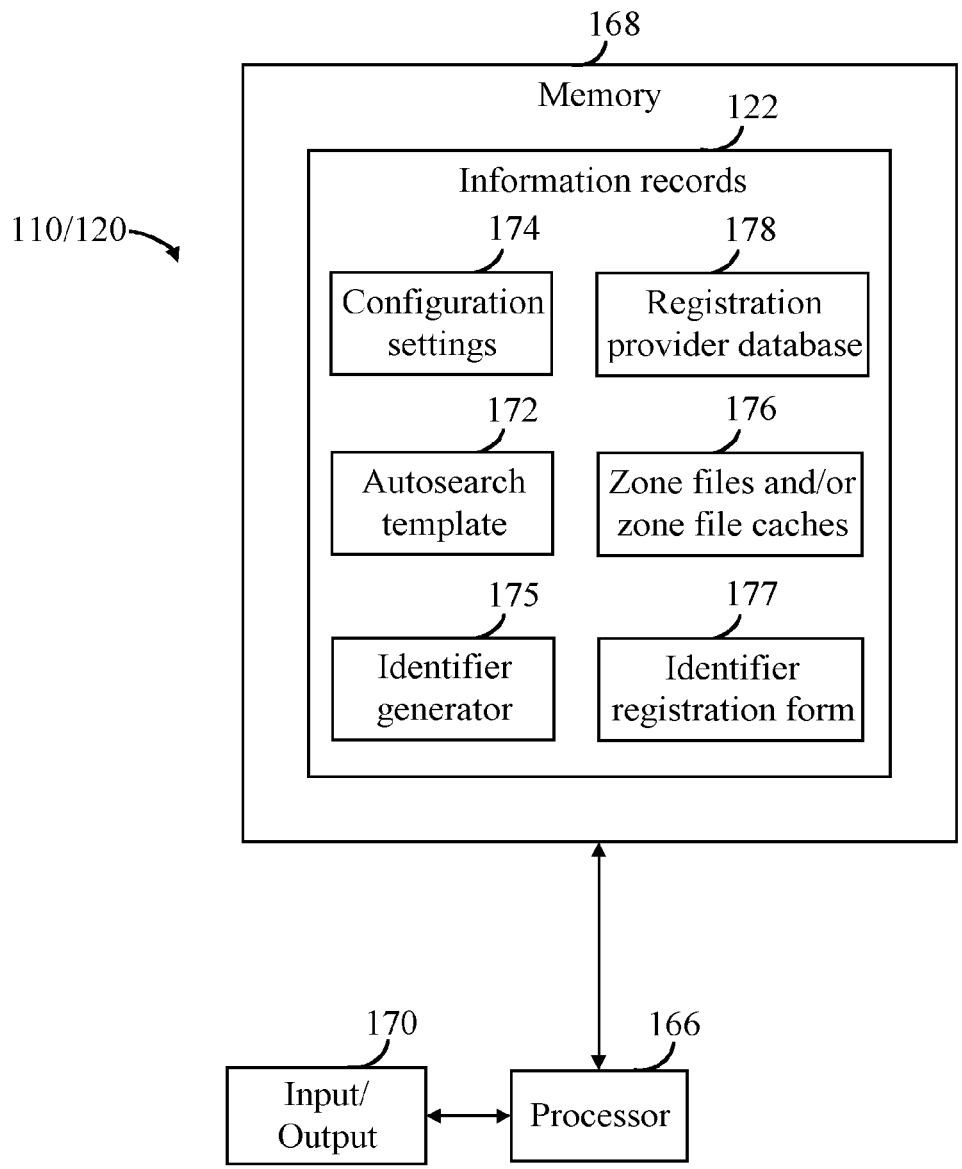
FIG. 1c is a block diagram illustrating exemplary information records stored in memory in accordance with the present invention.

FIG. 1c illustrates a block diagram of a storage device such as memory 168 in operative association with a processor 166. The processor 166 is operatively coupled to input/output devices 170 in a client 110 and/or server 120 computing system. Stored in memory 168 may be programs, scripts, and information records 122 having any combination of exemplary content such as lists, files, and databases. Such records may include for example: configuration setting information 174, registration provider database 178, autosearch templates 172, zone files/zone file caches 176, identifier generator 175, and identifier registration form 177. These information records 122 are further introduced and may be discussed in more detail throughout the disclosure of this invention.

Figure 1D:
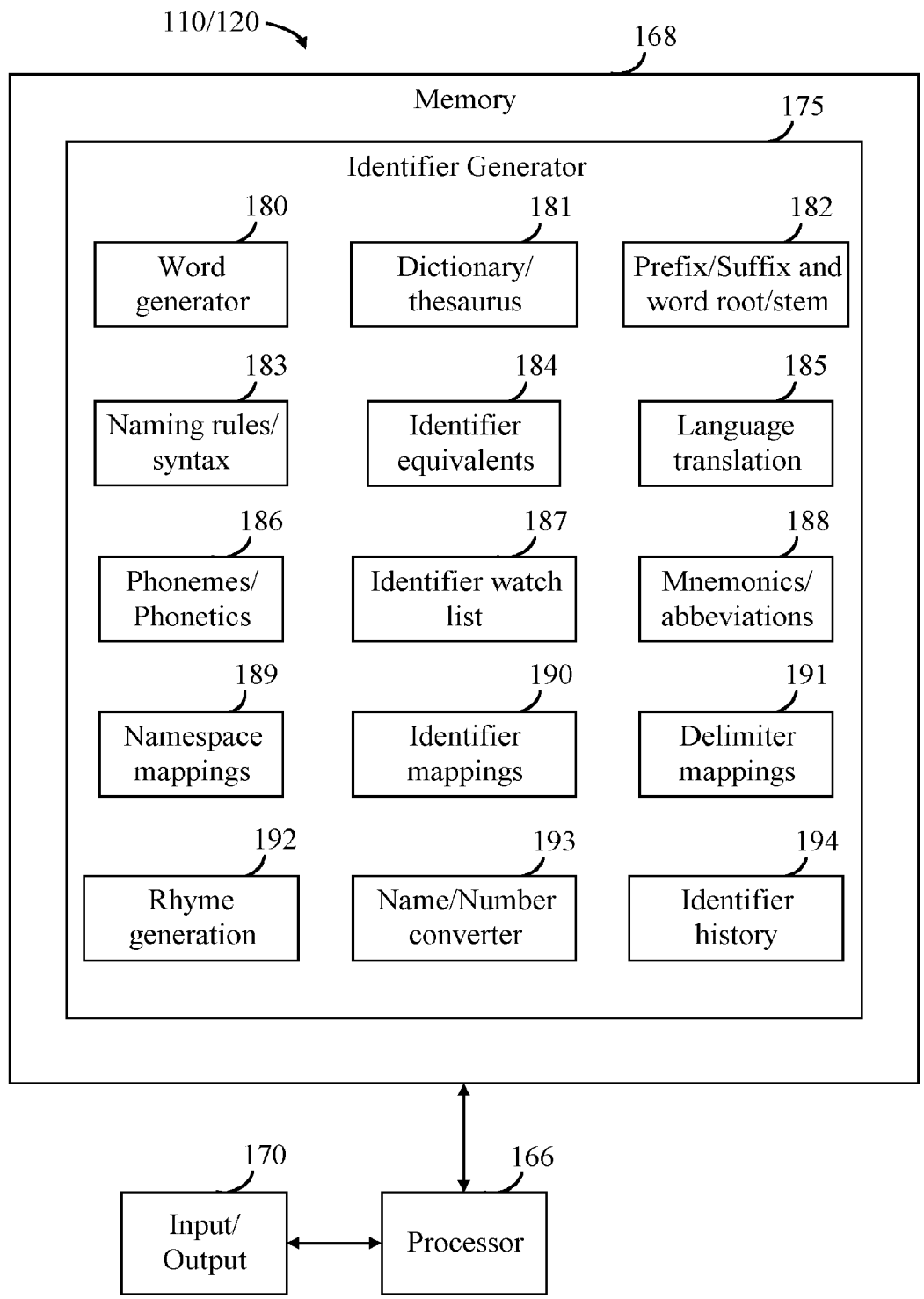
FIG. 1d is a block diagram illustrating exemplary information records for an identifier generator stored in memory in accordance with the present invention.

FIG. 1d illustrates a block diagram of a storage device such as memory 168 in operative association with a processor 166. The processor 166 is operatively coupled to input/output devices 170 in a client 110 and/or server 120 computing system. Stored in memory 168 are elements/components of an identifier generator 175. Such components may include for example: word generation methods 180, dictionary/thesaurus 181, prefix/suffix and word root/stem 182, set of heuristic naming rules/namespace syntax 183, identifier equivalents 184, language translation 185, phonetics/phonemes (e.g., misspelling) 186, identifier watch list 187 (e.g., list of desirable descriptors, personal identifier portfolio, competitor identifier portfolio), mnemonics/abbreviations 188, namespace mappings 189, identifier mapping 190, delimiter mapping 191, rhyme generation 192, name/number conversion 193, and identifier history 194. These identifier generator components 175 may be further introduced and discussed in more detail throughout the disclosure of the present invention.

Figure 2A:
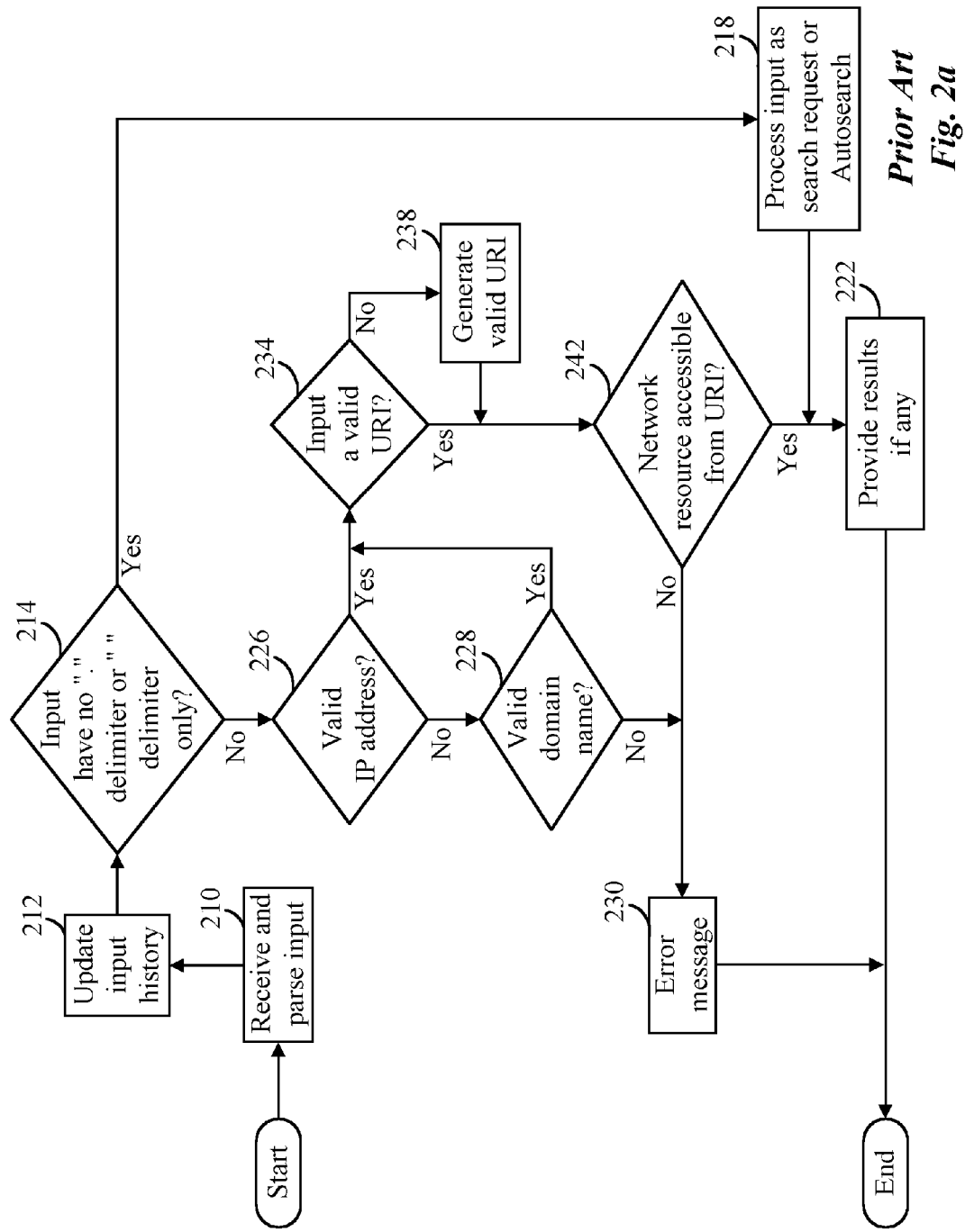
FIG. 2a is a top-level flowchart illustrating the steps performed by a prior art system for accessing a network resource from a navigation or resource location request.

FIG. 2a is a top level flowchart illustrating the steps of an exemplary prior art system for accessing a network resource from a navigation or resource location request. A device such as a network access apparatus 110, servlet, applet, stand-alone executable program, or user interface element such as a text box object, command line, speech to text interface, location field 154 of a web browser 112, may receive and parse input such as text or voice in step 210 and input history 196 is updated in step 212. Tests are then performed to determine how to process the received input 210. For instance, when it is determined in step 214 that input 210 has no "(dot)" delimiters or "delimiters only, it becomes clear that there is no domain name or IP address present and input 210 may be processed as a search request (e.g., AutoSearch feature) in step 218. Results if any, are then provided (e.g., notified, accessed, and/or displayed) in step 222. When the presence of the "(dot)" delimiter is determined in step 214, the input may include either an IP address or a domain name (e.g., input includes one or more "(dot)" delimiters only). When it is determined in step 226 that input does not include a valid IP address and determined in step 228 that input does not include a valid domain name, a browser error message may be displayed in step 230.

When input includes a valid IP address (step 226) or when input includes a valid domain name (step 228), it may then be further determined in step 234 whether input 210 includes a valid URI. If there is no valid URI, then a valid URI may be generated in step 238 from input 210. For instance, if a scheme/protocol is missing, the web browser may add the prefix "http://" to the text or another scheme prefix. After performing input validity tests, the steps of domain name resolvability may be performed. When a received (step 234) or generated (step 238) valid URI is determined accessible in step 242, then results, if any, may then be provided in step 222. However, when a valid URI is determined not accessible in step 242, an error message may be displayed in step 230.

One example of such a prior art system is when a domain name (e.g., "example(dot)com") is entered into a location field 154 of a web browser program such as MSIE. The MSIE browser generates a URI (e.g., "http://www(dot)example (dot)com") from the domain name. If the domain name is resolvable (e.g., the domain name is successfully translated into its corresponding IP address) then the web browser attempts to access content from a web server corresponding to the URI. If the domain name is not resolvable, then input 210 may be passed and the following URI is generated:

"http://auto(dot)search(dot)msn(dot)com/response(dot) asp?MT=example(dot) com&srch=3&prov=&utf8"

The "(dot)" is a delimiter of the DNS system whereas the " " is a delimiter of plain text language. When a keyword search is provided as input, (e.g., "search example") it may be determined that DNS name resolution is unnecessary and input 210 may be immediately redirected to the Microsoft Network (MSN) AutoSearch feature. In effect, all input that can not be successfully resolved/located/accessed may be redirected to the server at "auto(dot)search(dot)msn(dot)com" and processed accordingly as either an error message or search request. The Netscape Navigator browser program does not provide additional processing when a domain name is not resolvable, and instead, displays the following error message: "Browser is unable to locate the server: example (dot)com The server does not have a DNS entry. Check the server name in the Location (URL) and try again."

Figure 2B:
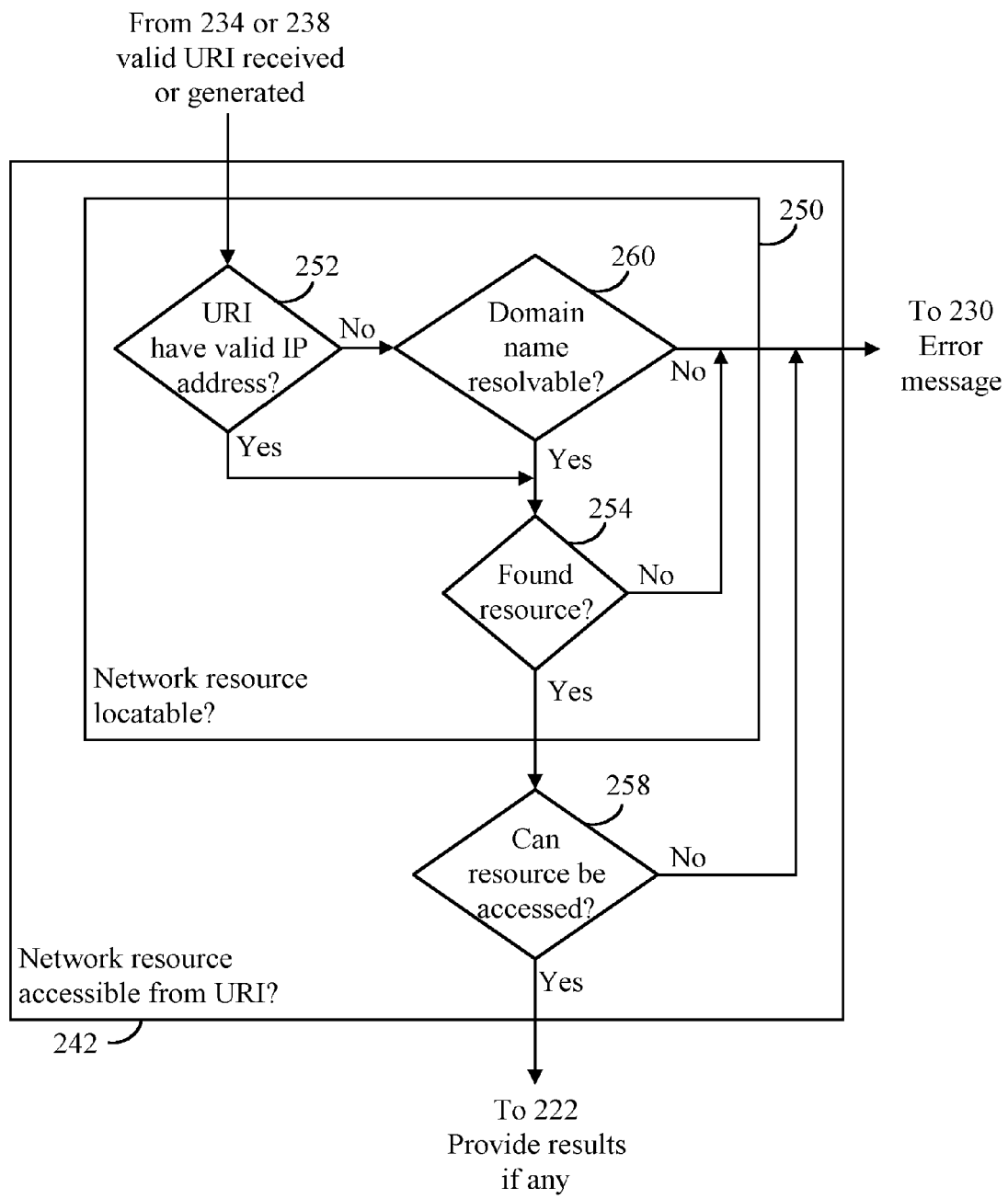
FIG. 2b is a flowchart illustrating the steps performed by a prior art system for determining whether a URI is accessible.

FIG. 2*b* more specifically illustrates steps that are performed for determining whether the URI is accessible (step 242). It is first determined in step 250 whether a network resource can be located from the received (step 234) or generated (step 238) valid URI. When the URI is determined in step 252 to not include a valid IP address, and instead includes a domain name, it is then determined in step 260 whether the domain name is resolvable. Domain name resolution is explained in P. Mockapetris, "Informational RFC (Request for Comment) 1035: Domain Names—Implementation and Specification", Internet Engineering Task Force (IETF), November 1987, "http://www(dot)faqs(dot)org/rfcs/rfc1035 (dot)html".

When the domain name is determined resolvable (step 260) or when the URI includes a valid IP address (step 252) it is further determined in step 254 whether a network resource such as a web page or web server can be located or found from the URI. If so, then the network resource can be located (step 250) and it is determined in step 258 whether the network resource can be accessed. When content, for example, can be accessed from the web server (network resource) then the network resource is accessible from URI (step 242) and results, if any, may then be provided in step 222. When the domain name is determined not resolvable (step 260) or when the resource can not be found (step 254) or when the resource can not be accessed (step 258) then an error message is displayed in step 230.

MSIE browser may redirect such input to the autosearch feature, but is configured to prompt the client browser to display an error message. The domain name that is not valid or not resolvable has never been further processed by the autosearch or routed to another naming service/resolution provider or registration provider for further processing. For example, such input is not routed to a RealNames server and/or resolver for domain name resolution or registration.

Figure 2C:
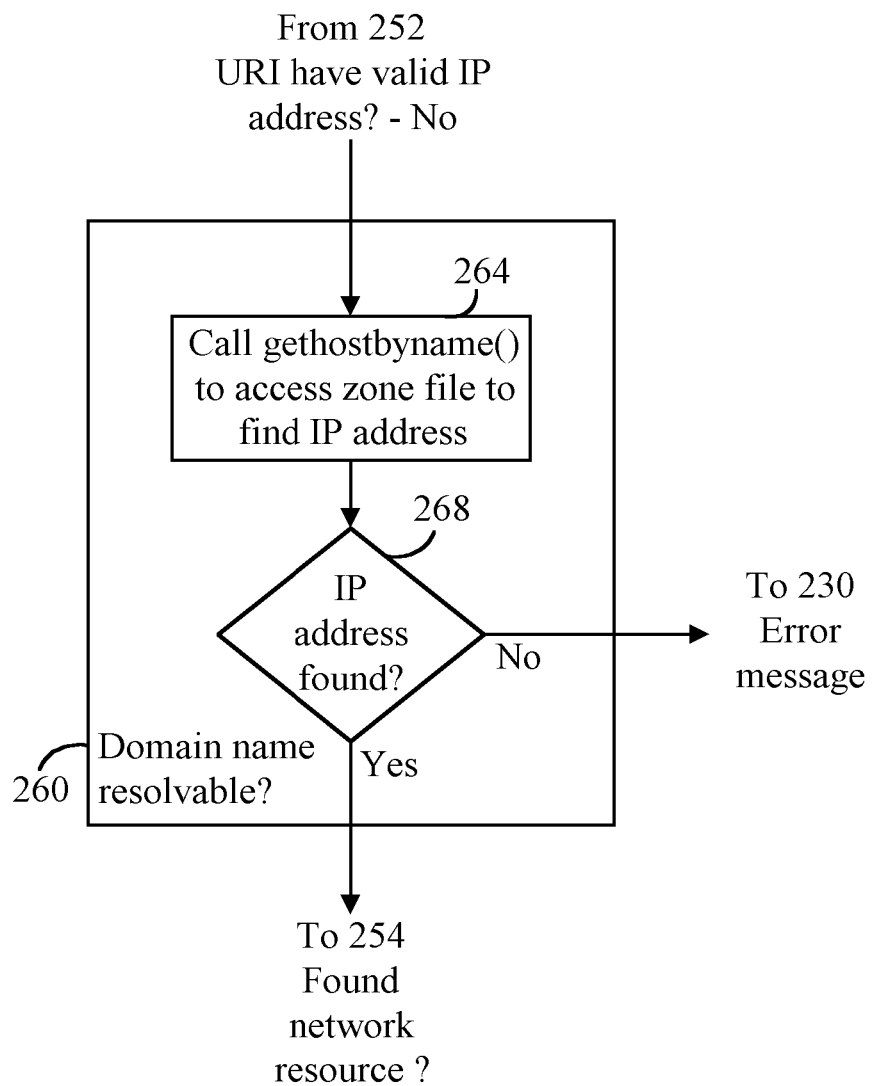
FIG. 2c is a flowchart illustrating the steps of an exemplary prior art system for determining domain name resolvability.

FIG. 2*c* is a flowchart illustrating the steps of an exemplary prior art system for determining domain name resolvability. Specific steps for the determination of domain name resolvability (step 260) include issuing a function call in step 264 from the web browser 112 to gethostbyname( ) from the resolver library 114 to translate the domain name into its corresponding IP address from the DNS database 124 of a DNS server system 120'. When gethostbyname( ) returns a NULL pointer in step 264, then it is determined in step 268 that no IP address is found and an error message is displayed in step 230. However, when an IP address is found in step 268, then a request is submitted to find (step 254) and access (step 254) the network resource located at the IP address.

As discussed, domain names are primarily processed by either name resolution or resource location services and also processed by registration services as well. When a domain name is received as input to a registration service, the availability of the domain name is determined. If the domain name is not available, registrant information is returned and the client is notified that the domain name in question is not available and provides the further option of checking the availability of other domain names. When the domain name is available, the user is presented with the choice of registering the domain name. Upon completion of registration, another domain name can be checked for availability.

Figure 3A:
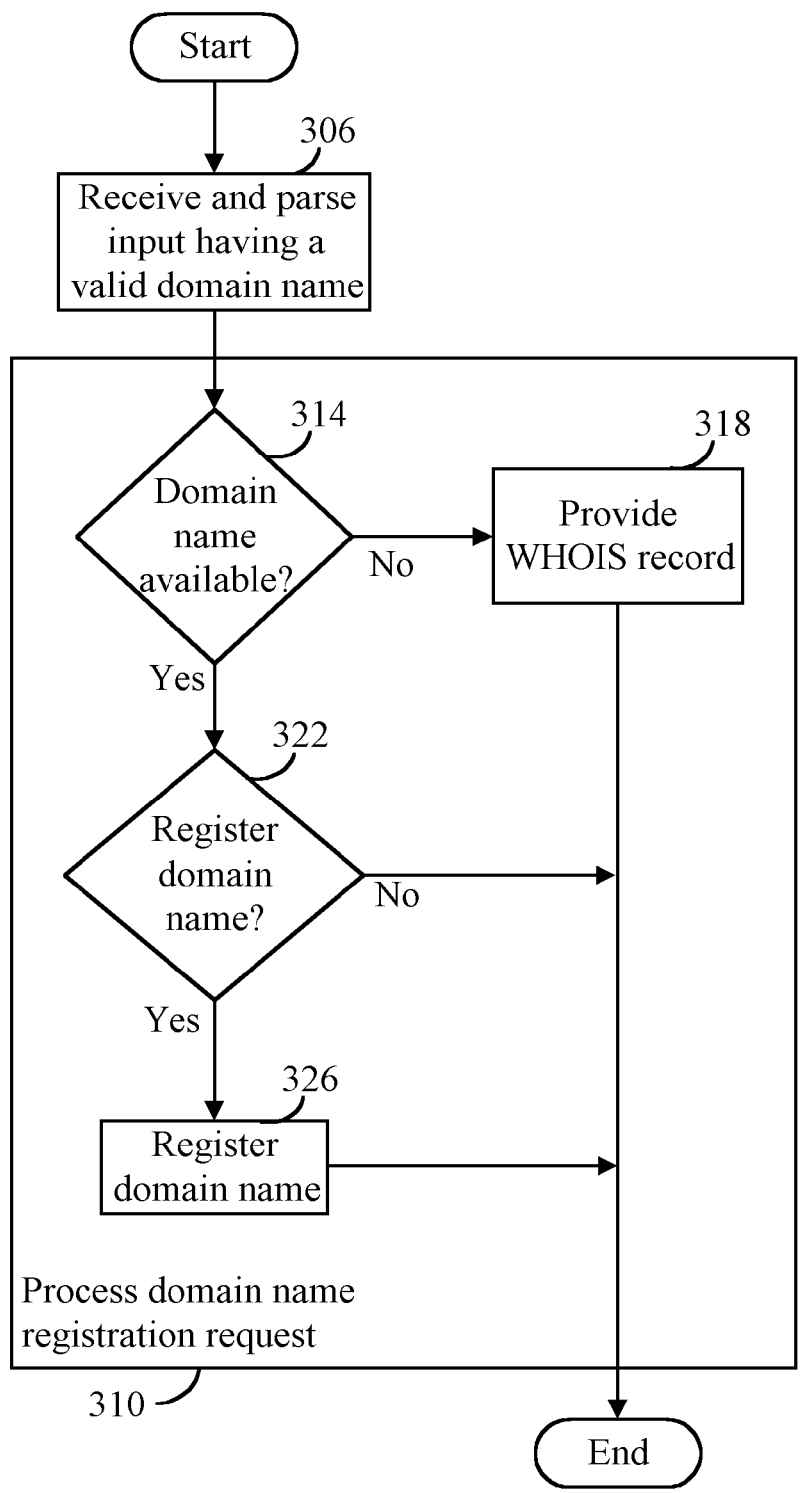
FIG. 3a is a flowchart illustrating the steps performed by a prior art system for processing a domain name registration request.

FIG. 3*a* illustrates such a registration service. A device, network access apparatus 110, servlet, applet, stand-alone executable program, or a user interface element such as a text box object, receives and parses input having a valid domain name in step 306. The valid domain name is then processed as a registration request in step 310. To process such a request, availability of the domain name 306 is determined in step 314. If the domain name 306 is determined to be not available in step 314, then a record from a corresponding WHOIS database is retrieved and provided in step 318. However, when the domain name 306 is determined available in step 314, then such information is presented accordingly, prompting the user in step 322 to register the domain name. When it is determined in step 322 that the user would like to register the domain name 306, further information is presented to assist the user in registering the domain name in step 326. Specification of the WHOIS protocol is provided in K. Harrenstien, M. Stahl, and E. Feinler, "Informational RFC (Request for Comment) 954: NICNAME/WHOIS".

Figure 3B:
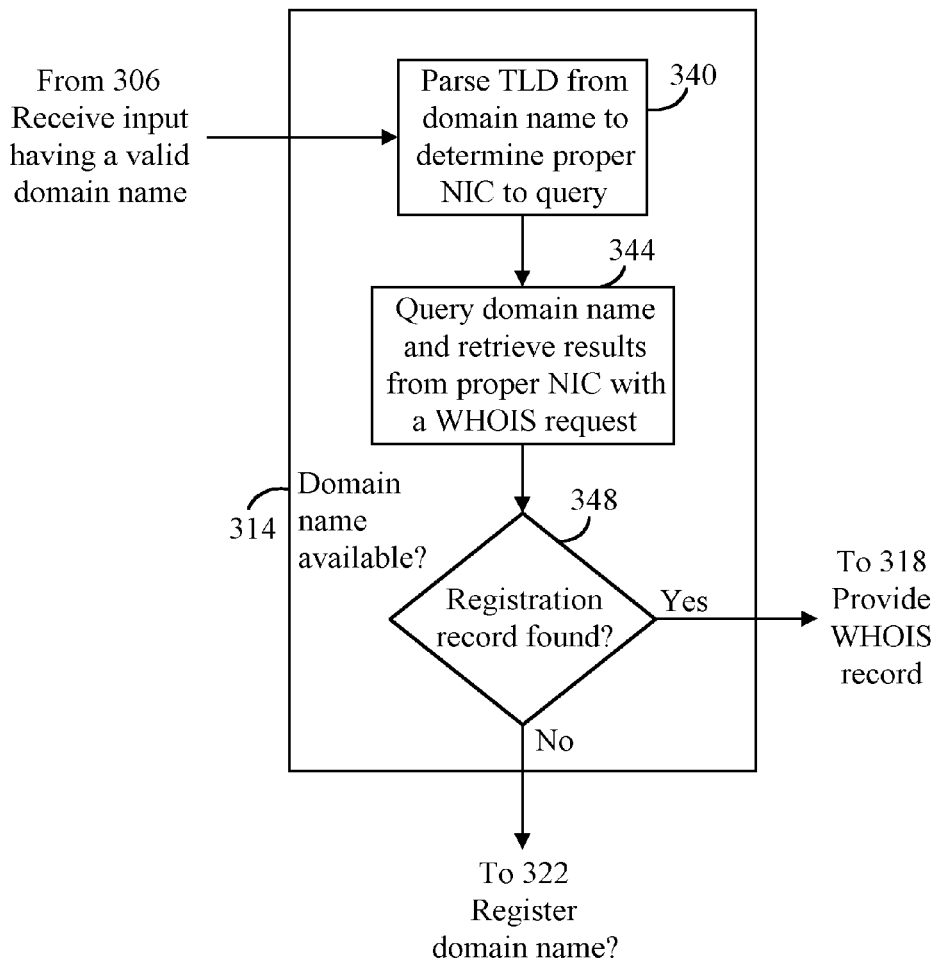
FIG. 3b is a flowchart illustrating the steps performed by a prior art system for determining domain name availability.
Figure 3C:
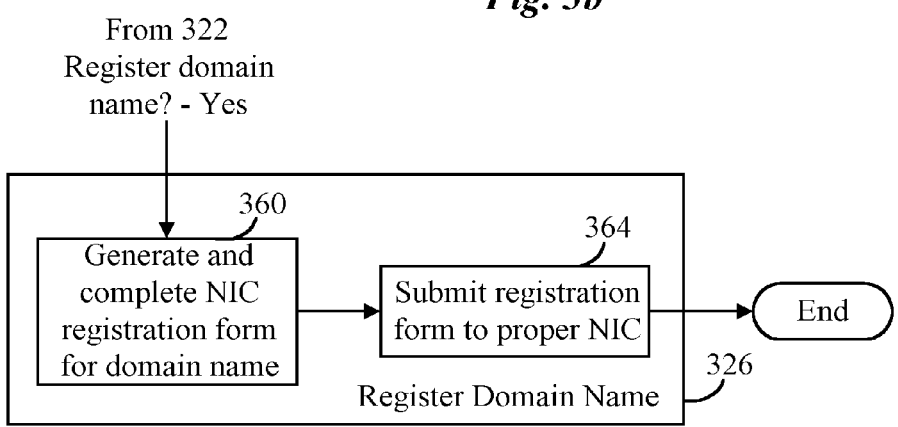
FIG. 3c is a flowchart illustrating the steps performed by a prior art system for registering a domain name.

FIG. 3*b* more specifically illustrates the steps performed for determining domain name availability (step 314). A TLD is parsed in step 340 from the valid domain name 306 to determine which NIC to query. A WHOIS or RRP request of the domain name 306 is submitted in step 344 to the proper NIC or Registry and query results are retrieved. When a registration record is found in step 348, the record is displayed in step 318 from the WHOIS database, otherwise the user is prompted in step 322 to register the domain name. FIG. 3*c* more specifically illustrates the steps performed for registering the domain name in step 326. When it is determined in step 322 that the user would like to register the domain name in step 326, the user completes a NIC registration form in step 360. The form is then submitted in step 364 to the proper NIC authority for processing.

FIG. 4*a* is a top-level flowchart illustrating a new combination of steps in accordance with the present invention for the processing of resource location services. As discussed in FIG. 2*a*, when a valid URI having a valid domain name is generated (step 238) or received (step 234), the accessibility of the URI is then determined in step 242. As previously explained and shown in FIG. 2*b*, one step in determining URI accessibility is the determination of domain name resolvability (step 260). Rather than displaying an error message (step 230) or processing a search request (step 218) in response to determining that a network resource can not be accessed (step 242), can not be located (step 250), or that a domain name can not be resolved (step 260), at least a portion of the URI is instead redirected to registration services and processed in step 410 as a registration request (discussed in more detail in conjunction with FIG. 7*a*).

FIG. 4*b* is a top-level flowchart illustrating how an error message may be used in accordance with the present invention. As discussed in FIG. 2*a*, when a valid URI having a valid domain name is generated (step 238) or received (step 234), the accessibility of the URI is then determined in step 242. As previously explained and shown in FIG. 2*b*, one step in determining URI accessibility is the determination of domain name resolvability (step 260). Rather than automatically processing a registration request (step 410) or processing a search request (step 218) in response to determining that a network resource can not be accessed (step 242), can not be located (step 250), or that a domain name can not be resolved (step 260), in an alternative embodiment of the present invention, a web page 150 and/or error message (step 230) is provided in step 415 having at least one hyperlink that when activated can perform a WHOIS or RRP request (step 344) on the domain name and/or process the registration request (step 410). Such a web page 150 or error message (step 230) having at least one hyperlink may be provided when a domain name or IP address is determined not valid (step 266 or step 228) and does not rely upon having to determine domain name resolvability (step 260) as a prerequisite step. In addition, further options such as performing a search request (step 218) or modifying configuration settings 174 may also be included as hyperlinks in such a resulting web page 150 or error message (step 230).

FIG. 4*c* is a flowchart illustrating additional steps for further integration of resource location and registration services. After the registration request is processed in step 410, it is determined in step 420 whether a search request is processed. More specifically, it is further determined in step 430 whether received input 210 is to be processed as a search request (step 218). When this is the case, a search request is constructed from the identifier (e.g., domain name) and processed in step 218 and results if any, are then provided in step 222.

Figures 5A, 5B:
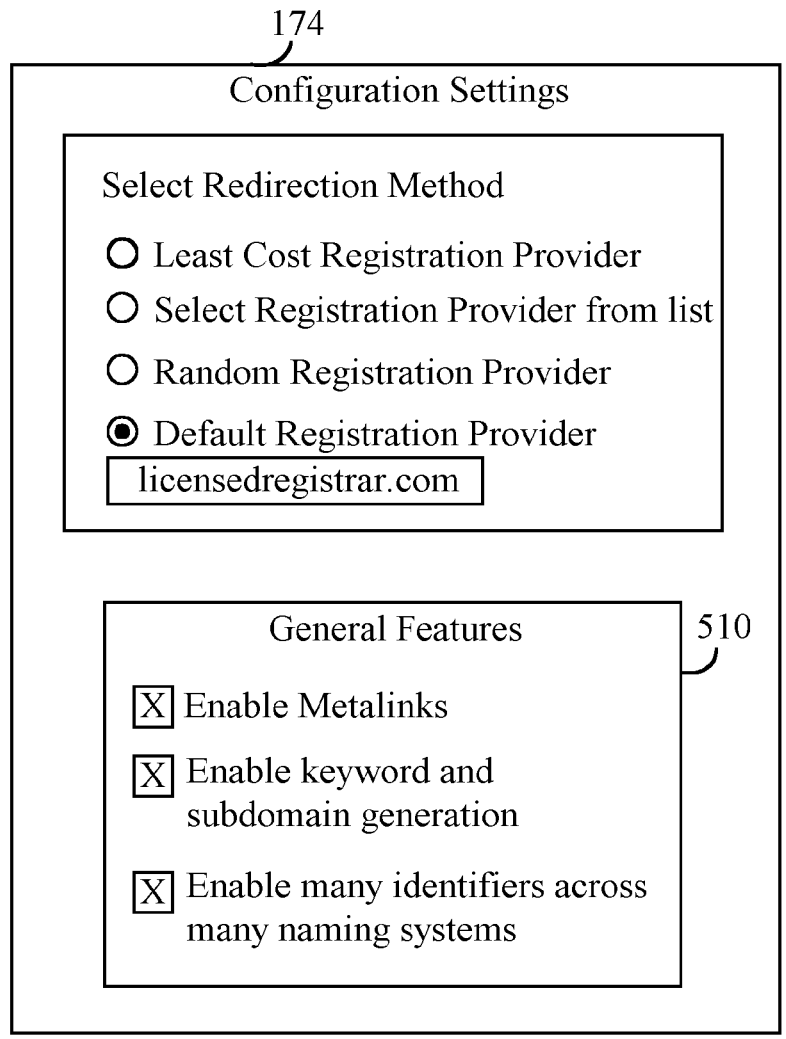
FIG. 5a is a diagram depicting an exemplary configuration settings interface in accordance with the present invention for selecting URI redirection.
FIG. 5b presents an exemplary table in accordance with the present invention illustrating the minimum data structure of a registration provider database.

FIG. 5*a* illustrates user modifiable configuration settings 174, which may be accessed by the browser for selecting the user preferred URI redirection in response to determining that a network resource can not be accessed (step 242), can not be located (step 250), or that a domain name can not be resolved (step 260). Configuration settings 174 may allow choice of URI redirection to either a least cost registration provider (discussed in conjunction with FIG. 5*b*), a list of registration providers that can be selected at the time of redirection, the selection of a random registration provider, or the redirection of a predetermined or default registration provider. Offering such selection features can assure that the redirection to registration services are better distributed to those participating registration providers such as accredited domain name registrars using the SRS. Also included, are general features 510 such as enabling metalinks (discussed in conjunction with FIG. 9*c*), enabling keyword and subdomain generation (discussed in conjunction with FIG. 7*a*), and enabling multiple identifiers across multiple naming systems (discussed in conjunction with FIGS. 9*a* and 9*b*).

FIG. 5*b* illustrates the minimum data structure of a registration provider database 178 including registration provider 524 and price/cost 528. When least cost registration provider is chosen from configuration settings 174, consulting from a table of registration cost information is performed by accessing the registration provider database to select one or more records indicating the lowest price for the purchase of a domain name and/or keyword and the like. Additional table entries may be included such as rates, time and expiration date (e.g., length of purchase time before renewal), quantity, and customized discount methods, etc. Real-time price changes, may be provided to the registration provider database for price updates based upon surveys, bidding, bulk discounts, purchasing more time, offers, rebates, supply and demand, etc. In the case, where more than one record is selected (e.g., many registration providers competing for the same lowest price), the client machine is redirected at random to those qualifying registration providers. In addition, when select registration provider is chosen from configuration settings 174, a list box is generated from the registration provider database 178 at the time of redirection for the user to select a registration provider from.

Figure 5C:
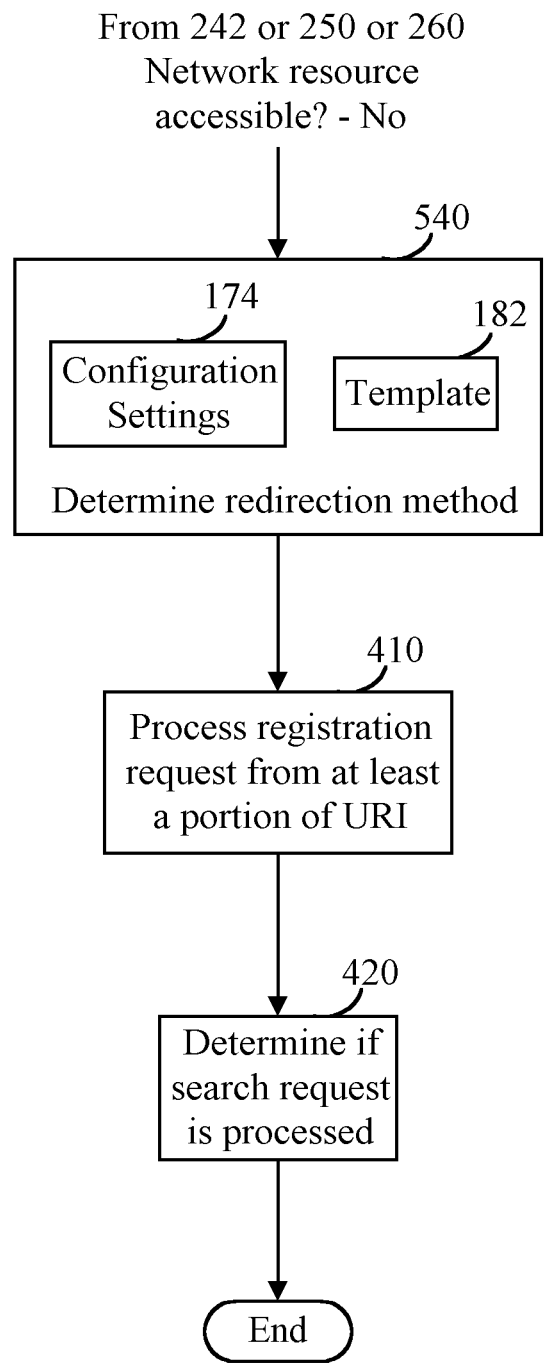
FIG. 5c is a flowchart illustrating the step performed of determining which registration provider may process a registration request in response to the determination that a network resource can not be accessed or located or that a domain name is unresolvable in accordance with the present invention.

FIG. 5*c* illustrates the additional optional step of determining a redirection method (step 540). Redirection can be determined in step 540 by retrieving configuration settings 174 in response to determining that a network resource can not be accessed (step 242), can not be located (step 250), or that a domain name can not be resolved (step 260), and before a registration request is processed (step 410). Redirection can also be determined in step 540 by accessing a template 172 from the MSIE autosearch feature either in response to retrieving a redirection method or in response to determining that a network resource can not be accessed (step 242), can not be located (step 250), or that a domain name can not be resolved (step 260). The template is used to generate a valid URI for redirecting the client (e.g., web browser) to a registration provider for processing a registration request (step 410). Furthermore, after the registration request is processed in step 410, it is determined in step 420 whether a search request is processed.

Figure 6A:
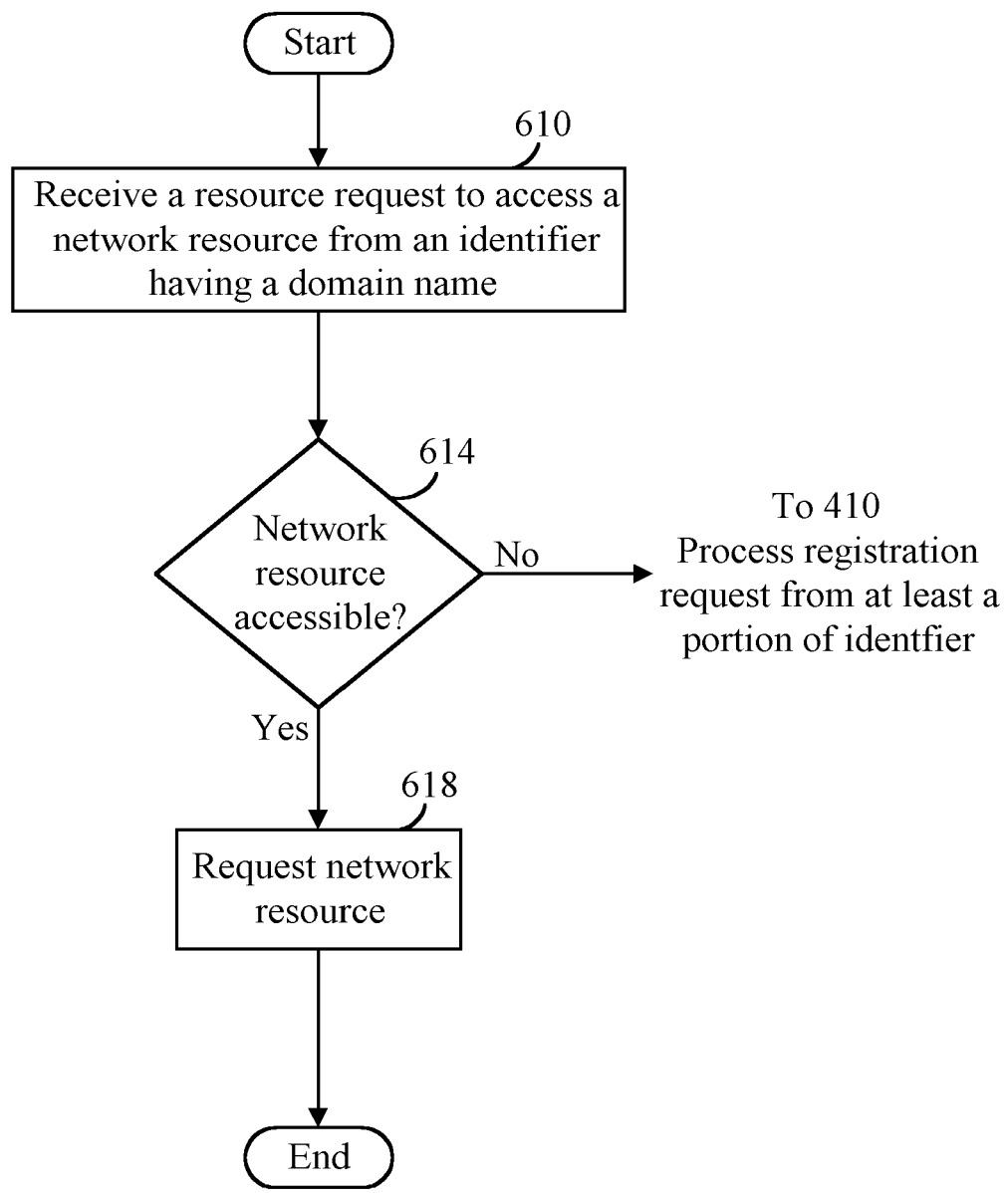
FIG. 6a is a top-level flowchart illustrating the steps for accessing a network resource in accordance with the present invention.
Figure 6B:
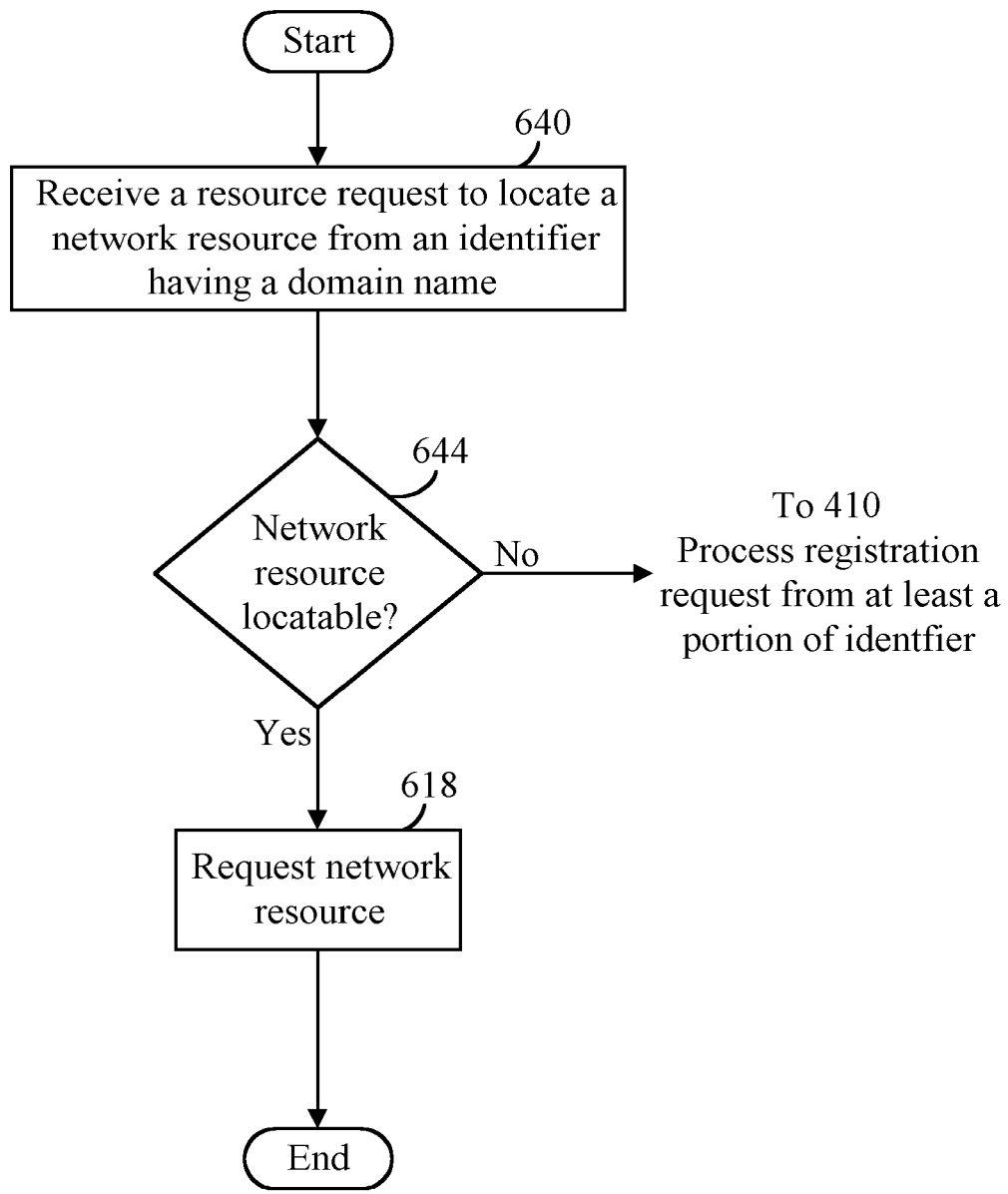
FIG. 6b is a top-level flowchart illustrating the steps for locating a network resource in accordance with the present invention.

FIG. 6*a* is a top-level flowchart illustrating the steps for accessing a network resource. A resource request to access a network resource from an identifier having a domain name is received in step 610 and determined in step 614 whether the network resource is accessible. The network resource is requested in step 618 when the network resource can be accessed (step 614) otherwise a registration request from at least a portion of identifier may be processed in step 410. FIG. 6*b* is a top-level flowchart illustrating the steps for locating a network resource. A resource request to locate a network resource from an identifier having a domain name is received in step 640 and determined in step 644 whether the network resource can be located. The network resource is requested in step 618 when the network resource can be located (step 644) otherwise a registration request from at least a portion of identifier may be processed in step 410.

There are many web hosting providers who have neglected to take advantage of the CNAME resource record to create an alias domain name corresponding to a FQDN. For instance, the CNAME record is used to make "example(dot)com" an alias for the FQDN, "www(dot)example(dot)com". When "example(dot)com" is received from an HTTP request and there is no corresponding CNAME record, a network resource may not be accessed and an error message displayed as a result. As explained in U.S. Provisional Application Ser. No. 60/160,125 filed Oct. 18, 1999, by Schneider, entitled "Method and system for integrating resource location, search services, and registration services", now abandoned, a subdomain such as "www" may be prepended to a domain such as "example(dot)com" in response to determining that a network resource can not be accessed from the URI "http://example(dot)com". Rather than providing an error message, further steps are taken to determine whether a network resource can be accessed from "http://www(dot)example(dot)com" instead.

Figure 7A:
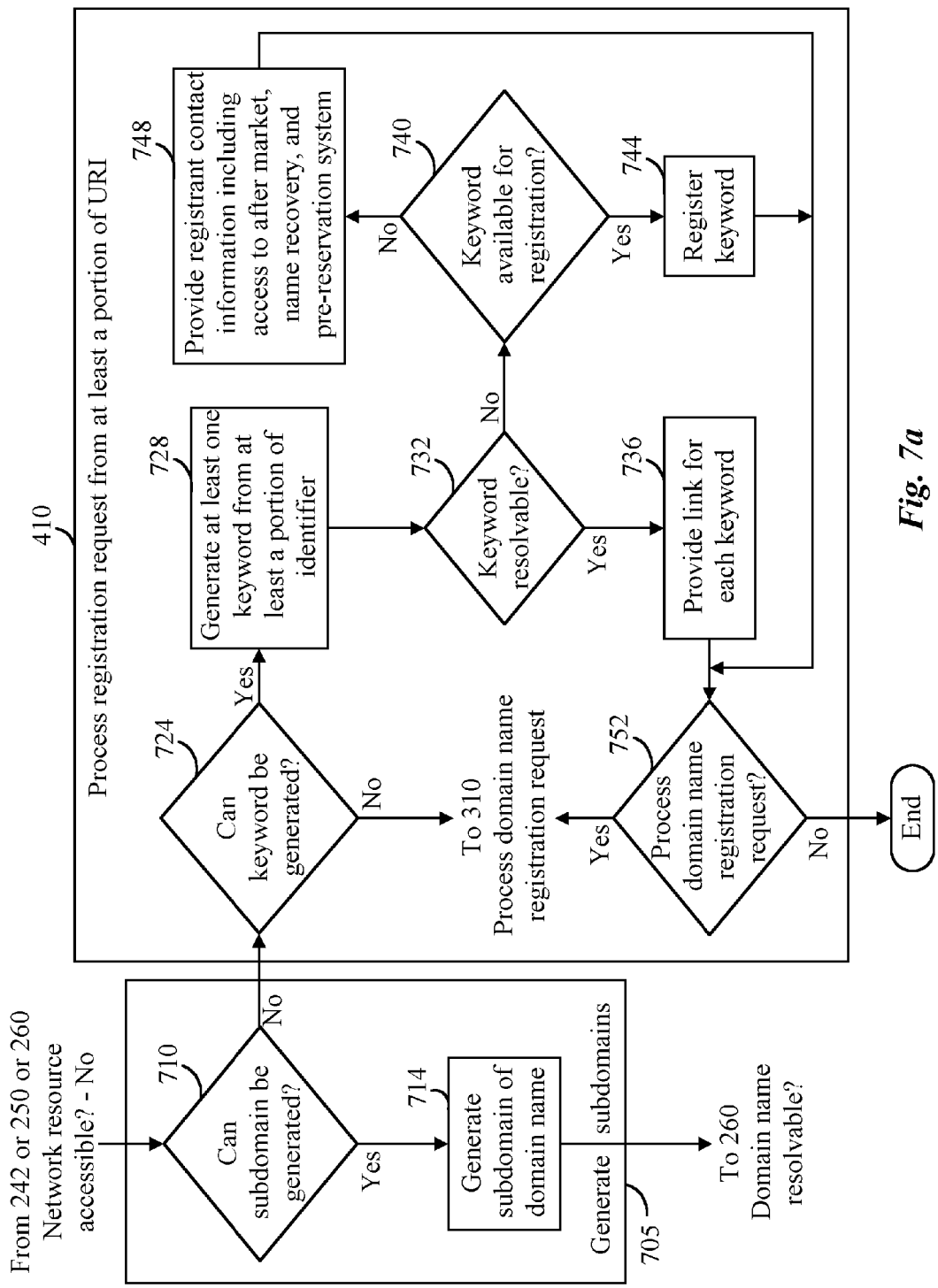
FIG. 7a illustrates the steps performed for further processing a network resource request and/or processing a registration request in accordance with the present invention.

FIG. 7*a* illustrates the steps performed for further processing a network resource request and/or processing a registration request in accordance with the present invention. When a network resource can not be accessed (step 242), can not be located (step 250), or particularly when a domain name can not be resolved (step 260), it may be further determined in step 705 if subdomains of the domain name are generated. For instance, a name server corresponding to the network resource is found but does not include a corresponding IP address in the domain name zone file for the domain name. However, IP addresses may be found for subdomains of the domain name. For instance, the network resource corresponding to the identifier "http://example(dot)com" can not be accessed nor an IP address found for "example(dot)com" in the example(dot)com zone file, but an IP address can be found instead for "www(dot)example(dot)com" in the example(dot)com zone file.

First, it may be determined in step 710 whether subdomains of the domain name can be generated. If not, then a registration request may be processed in step 410. However, when a can be generated, at least one subdomain of the domain name is generated in step 714 (discussed in more detail in conjunction with FIG. 7b). For each subdomain that is generated, it is then further determined in step 260 whether the generated subdomain of the domain name is resolvable. These steps are repeated until a generated subdomain is resolvable or another subdomain can not be generated.

Further steps are illustrated for processing a registration request (step 410). First it is determined whether at least one keyword can be generated in step 724 from the received domain name or subdomain of a domain name. If so, then at least one keyword is generated in step 728 from at least a portion of identifier. For each generated keyword, it is determined in step 732 whether the keyword is resolvable. A generated hyperlink may then be provided in step 736 for each resolvable keyword. May it be noted that a keyword resolution request may be performed (not shown) by activating the generated hyperlink. In the case, where only one keyword is resolvable, the keyword resolution request may be automatically process instead of displaying a generated hyperlink. For all keywords that are not resolvable, it is determined in step 740 whether such keywords are available for registration. For any keywords that are determined available for registration, a keyword registration form is provided in step 744 by a keyword registration provider. However, for all keywords that are not available for registration, keyword registrant contact information is provided in step 748 including access to keyword after market information, keyword recovery, and a keyword pre-reservation system. When keyword links are provided (step 736), a keyword registration form is provided and processed (step 744), or keyword registrant contact information is provided (step 748), then it may be further determined in step 752 whether to process the domain name as a registration request. If so, or when a keyword can not be generated (step 724), then a domain name registration request is processed in step 310.

Figure 7B:
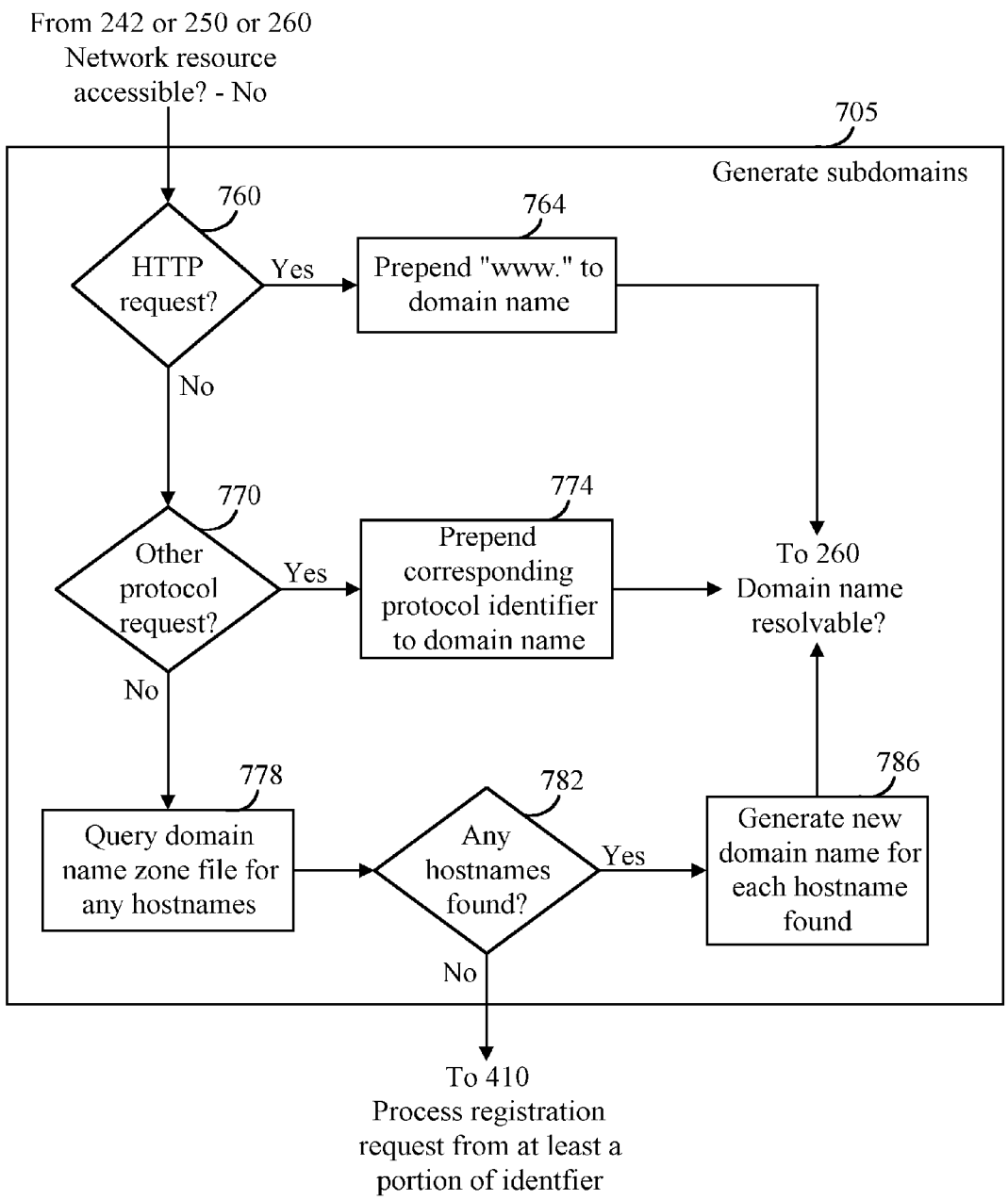
FIG. 7b illustrates the steps performed for generating subdomains of a domain name in accordance with the present invention.

FIG. 7b illustrates the steps performed for generating subdomains of a domain name in accordance with the present invention. First it is determined in step 760 whether the identifier or URI includes the HTTP protocol identifier. If so, then a "www(dot)" is prepended in step 764 to the domain name. If not, then it is determined in step 770 what other protocol request had been used. For any other protocol request, a protocol identifier that corresponds to a given hostname is prepended in step 774 to the domain name. For example, when a network resource can not be accessed from a FTP request of the URI "ftp://example(dot)com", a "ftp" hostname is prepended to form a new URI "ftp://ftp(dot)example(dot)com" and then determined whether a network resource can be accessed from the new URI. When no network resource can be found from the above methods, a domain name zone file may be queried in step 778 for any hostnames. If no hostnames have been found in step 782 then a registration request is processed (step 410) otherwise a new domain name may be generated in step 786 for each hostname that is found. After a new domain name has been generated that is a subdomain of the previous domain name, it is then determined whether the new generated domain name is resolvable in step 260.

To date, wildcard redirection in TLD zone files has only been used for the purpose of enabling a TLD registry to also become the registrar by offering domain name registration services. Because of registrar competition in the gTLDs, wildcard redirection in a gTLD zone file has never been considered. In fact, wildcard redirection has never been used in ccTLD, alternative root TLD, and any other domain name zone files, for the purpose of creating competition between registration providers.

Figure 8A:
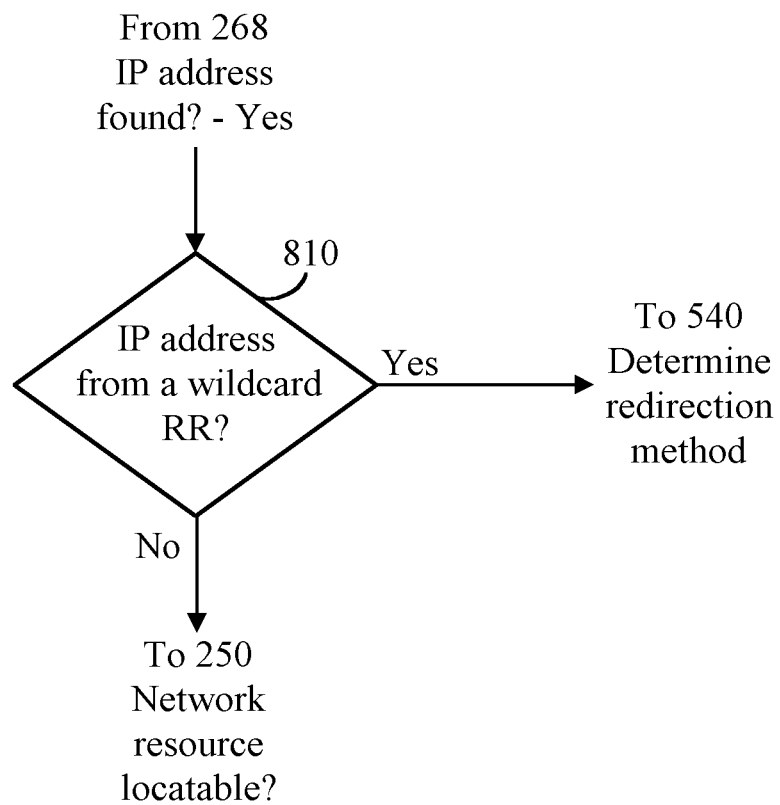
FIG. 8a illustrates the steps performed for determining a redirection method in response to detecting a wildcard resource record in accordance with the present invention.

FIG. 8a illustrates the steps performed for determining a redirection method in response to detecting a wildcard resource record in accordance with the present invention. When an IP address is found in step 268, it is determined in step 810 whether the IP address was retrieved from a wildcard resource record. If not, it is determined in step 250 whether a network resource can be located from the IP address. When an IP address is retrieved from a wildcard resource record, the option of determining a redirection method (step 540) may be provided enabling a user to select a registration provider from a plurality of registration providers.

FIG. 8b presents an exemplary file in accordance with the present invention of a zone file having a wildcard resource record. A portion of the (dot)NET (TLD) zone file includes the addition of a wildcard RR 830 for the purpose of redirecting domain names that would otherwise be considered unresolvable to a market driven registration provider system in this case called "registrarportal(dot)com". When the above TLD zone file is queried to resolve "isthisnameavailable(dot)net", it is determined that there is no SLD called "isthisnameavailable". The wildcard RR is detected and passes the query value of "isthisnameavailable(dot)net" to a server labeled "registrarportal(dot)com". In effect, the wildcard RR treats the query as resolvable and redirects "isthisnameavailable(dot)net" to "registrarportal(dot)com" for further processing.

As explained in U.S. patent application Ser. No. 09/650,827 filed Aug. 30, 2000, by Schneider, entitled "Method, product, and apparatus for determining the availability of similar identifiers across naming systems", the availability of an identifier such as a domain name may be determined across other naming systems such as a keyword registry (or vice-versa) operated by a resolution service provider (e.g., Real-Names or Netword) or operated by the search services of a portal web site or the like (e.g., Alta Vista, Lycos, Netscape, AOL, etc.) or by any other entity that registers keywords for the purpose of directory placement or advertising. For instance, the search for the availability of a RealNames Internet Keyword called "example" or the like is determined in response to the determination that the domain name "example(dot)com" is available for registration and is concurrently displayed to the potential registrant. In turn, the availability of "example(dot)com", "example(dot)net", etc. may be determined in response to determining that the keyword "example" is available for registration. Furthermore, when identifier availability across a plurality of naming systems is determined, then a registration interface having a universal identifier registration form may be used to contemporaneously register a plurality of identifiers across a plurality of naming systems with a single registration form.

In another example, when the domain name "example(dot)com" is available for registration, the additional selection of available TLDA names (e.g., "example(dot)news", "example(dot)sitemap", "example(dot)411", etc.) may be concurrently displayed for an entity to register a final selection from the list of valid and/or fictitious domain names. Other identifiers such as keywords, phone numbers, etc. may also be concurrently displayed as part of a final selection. Examples of concurrent registration may further include the search of a domain name based on the existing username or handle of an e-mail address (e.g., "myemailaddress(dot)com" is suggested in response to the existing identifier "myemailaddress@example(dot)com").

Figure 9A:
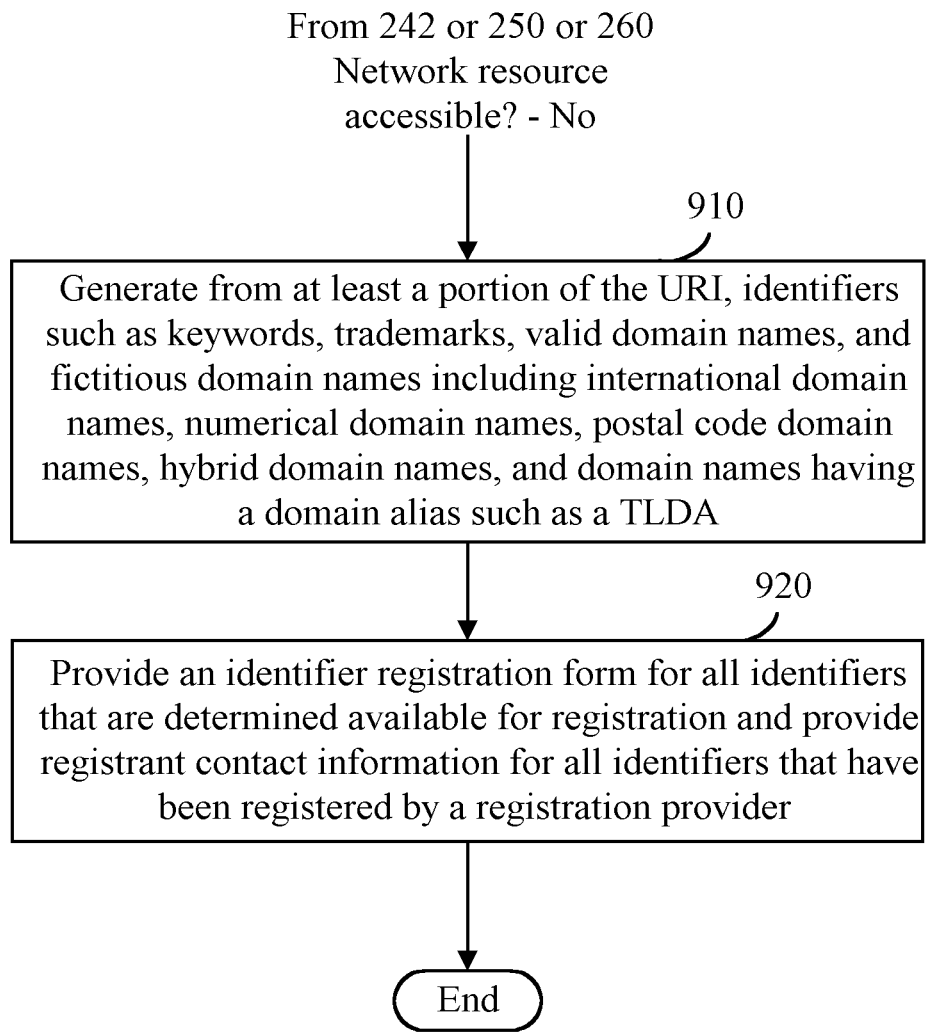
FIG. 9a is a flowchart illustrating the steps performed for integrating the contemporaneous registration of domain names and other identifiers such as keywords in accordance with the present invention.

FIG. 9a illustrates the steps performed for generating and contemporaneously determining the availability of identifiers across many naming systems. Whenever a network resource can not be accessed (step 242), can not be located (step 250), or when a domain name can not be resolved (step 260) from a URI, in response to performing a navigation request such as a resource identification and/or location request, identifiers such as keywords, trademarks, valid domain names, and fictitious domain names (e.g., international domain names, numerical domain names [216(dot)555(dot)1212], postal code domain names [example(dot)44106], hybrid domain names, and domain names having a domain alias such as a TLDA [name(dot)game]) may also be generated in step 910 from at least a portion of the URI. An identifier registration form 177 of all identifiers that are determined available for registration with access to registrant contact information of all identifiers that have been registered by a registration provider may then be provided in step 920.

Also, as discussed the present invention is by no means limited to the registration of identifiers such as domain names (e.g., valid domain names, fictitious domain names including TLDA names, and multilingual domain names), phone numbers (e.g., cell, fax, telecopier, pager, voice, data, etc.), and keywords (e.g., search term, RealName, Netword, Internet keyword, AOL keyword, advertising keyword etc.).

Other registerable naming systems having one or more registerable namespaces may include identifiers such as but not limited to Publisher Item Identifier (PII), Digital Object Identifier (DOI), Inter Deposit Digital Number (IDDN), International Standard Book Number (ISBN), International Standard Technical Report Number (ISRN), International Standard Serial Number (ISSN), Serial Item and Contribution Identifier (SICI), Book Item and Component Identifier (BICI), European Article Number (EAN), Universal Product Code (UPC), Standard Address Number (SAN), International Standard Audiovisual Number (ISAN), International Standard Work Code (ISWC), International Standard Music Number (ISMN), International Standard Recording Code (ISRC), Intellectual Property Identification (IPI), Uniform File Identifier (UFO, Uniform Resource Identifier (URI), Persistent Uniform Resource Locator (PURL), Universally Unique Identifier (UUID), Globally Unique Identifier (GUID), Namespace Identifier (NID), Bank Identification Number (BIN), Personal Identification Number (PIN), Mod 10 Number, credit card number, Electronic Serial Number (ESN), Mobile Identification Number (MIN), Automatic Number Identification (ANI), Social Security Number (SSN), Employer Identification Number (EIN), Taxpayer Identification Number (TIN), Vehicle Identification Number (VIN), World manufacturer identifier (WMI), Manufacturer Identification Number (MIN), Market Identifier Code (MIC), Standard Industrial Classification (SIC), Standard Occupational Classification (SOC), Stock Keeping Unit number (SKU), International Business Entity Identifier (IBEI), Institution Identification Code (IIC), National Provider Identifier (NPI), Dunn and Bradstreet Number (DUNS), SEC file number, patent number, trademark number, serial number, charter number, policy number, certification number, document identifier, reference number, invoice number, transaction identifier, validation code, account number, merchant code, reseller code, affiliate code, authorization code, network identifier, user identifier, PGP key, digital certificate, driver license number, license plate number, trademark, servicemark, tradename, fictitious name, company name, DBA, AKA, stock symbol, station identifier, broadcast station call letters, ham radio call letters, broadcast frequency number, street name, street address, ZIP code, IP address, host, e-mail address, ICQ number, nickname, screen name, username, alias, handle, document title, book title, song title, movie title, phrase, slogan, machine readable code, glyph, image, icon, animation, sequence of musical notes, date, time, name, abbreviation, mnemonic, moniker, label, alphanumeric, string, character, symbol, emoticon, token, integer, and number, etc.

Some naming systems may include a domain name system, fictitious domain name system, multilingual naming system, keyword system, telephone naming and numbering system, user naming system, address system, date/time system, language system, Dewey decimal system, catalog naming system, document system, resource naming system, image naming system, geographic naming system, identification naming system, and/or any other naming system that supports any listed identifier. Other examples of naming systems may include languages. Name generating programs may further include language translation as a means for selecting similar identifiers. The mapping of delimiters across all naming systems (not shown) may also be used as a means for similar identifier selection. Each naming system may be the primary registrar with respect to registering on behalf of registrars of other naming systems for concurrent registration. An open architecture system is implemented such that existing or future-naming systems may be easily integrated into alternate embodiments of the present invention. Each integrated system remains highly configurable to the specific context of the application.

Furthermore, each naming system may readily be integrated into a registration interface having a universal identifier registration form 177 assuring a robust system for registrants to easily register multiple identifiers from a single form 177. In effect, the registration form 177 may include a plurality of registration user interface elements for selecting from one of a plurality of identifiers and a plurality of naming systems. In addition, naming system providers may supply metadata to authorize their namespace/naming system to couple with the registration form 177 to enable users to register available identifiers through their naming system such as a keyword advertising naming system, for example.

Identifier generation may be provided from the identifier generator 175, which is configured to select and generate identifiers from a number of criteria by consulting from one of a word generation method 180, category of interest 181, dictionary 181, thesaurus 181, prefix 182, suffix 182, word root 182, word stem 182, set of heuristic naming rules 183, namespace syntax 183, identifier equivalents 184, language translation 185, phonetic spelling 186, phonemes 186, identifier watch list 187, list of desirable descriptors 187, personal identifier portfolio 187, competitor identifier portfolio 187, mnemonic method 188, abbreviation 188, namespace mapping 189, identifier mapping 190, delimiter mapping 191, rhyming method 192, name-to-number conversion 193, number-to-name conversion 193, and identifier history 194.

As explained in U.S. patent application Ser. No. 09/598,134 filed Jun. 21, 2000, by Schneider, entitled "Method and apparatus for integrating resolution services, registration services, and search services", registrant contact information such as the WHOIS record of a domain name registrant can be modified to provide additional results including metalinks.

For instance, when it is determined that a domain name is not available for registration, a record from the WHOIS database may be displayed including metalinks for accessing <META> tag information from the URI of a domain name to access content from corresponding web site, a hyperlink for dialing or faxing a telephone number, a hyperlink for accessing a map or guide to locate a postal address and/or surrounding local services, and a hyperlink for accessing the after market status of the domain name which may include a sale price by the registrant or from an auction and/or listing service.

FIG. 9b illustrates one aspect of a registration form 177. A registrant may access a link 930 which may provide a registrant an information window to input a previous registrant handle or current contact information. A list of identifiers that are currently available across many naming systems/namespaces may also be provided 935 (e.g., via identifier generator 175 or templates 172) for the registrant to choose from. Keywords or descriptors including identifiers representative of competitive interests may be provided 940 by the registrant/subscriber to be put in a watch list 187 to inform the subscriber of any available identifiers that may become available in the future. Such descriptors may also include any geographic, psychographic, and/or demographic information or those words that may be used to inform the subscriber of identifiers of interest to competitors. In addition, such descriptors or keywords may be suggested through the registration form 177 by accessing a link 945 which generates similar identifiers to help the subscriber select a desirable watch list/subscriber profile 187. Such registrant/subscriber information may be submitted to a registration provider of choice at any time.

FIG. 9c illustrates a methodology for extending functionality of WHOIS results by modifying the page source of a typical WHOIS request. For instance, the domain name "example(dot)com" may be converted into a hyperlink reference and/or metalink 960 so that a user may readily visit the homepage and/or sitemap of "example(dot)com". Also illustrated are hyperlinks 965 for accessing geographic information (e.g. maps) that corresponds to the domain name, and hyperlinks for dialing the telephone 970 so that the source or registrant of the domain name may be readily contacted if so desired. Furthermore, a hyperlink reference may be added to indicate that the domain name is available for sale 975 enabling access to an auction site, listing service, domain name broker, or the like. In addition, one or more links 980 may be provided to enable access to other services such as locking, protecting, and back ordering a domain name in the event of any future change in status of the current domain name.

Those skilled in the art may make and use a computer program product separate from all others. In addition, the program may be integrated as part of an operating system or may be a plug-in for a web browser 112. Such a program may be downloaded and installed for integration into the command line of a device or location field 154 of a browser program 112. Program installation may be activated in response to accessing a web site or any resource corresponding to a URI. Modifying the source code of the browser program 112 itself may be more desirable, in effect, enabling tens of millions of users to take advantage of resource identification/location services and registration services.

In the case of MSIE, modifications can be made to the script on the server "auto(dot)search(dot)msn(dot)com" that generates the "response(dot)asp" web page and all identifiers of network resources than can not be accessed or located, or any unresolved domain names can be redirected to a registration provider rather than processed as a search request. An extra template can be created and used in the registry of the MSIE autosearch feature. The template can further include the selection of which server to access for transparently performing a WHOIS or RRP request and/or access the server of a desired registration service of a registration provider such as an accredited registrar to perform such a registration request.

By using an extra template 172, the browser program does not have to be modified, thereby eliminating distribution costs for a browser or plug-in version update. For instance, when input having only "(dot)" delimiters such as a domain name (e.g., thisnameisprobablyavailable(dot)com) is determined unresolvable, an extra name/value pair is passed generating the following URI: "http://auto(dot)search(dot)msn(dot)com/response(dot)asp?MT=thisnameisproba blyavailable(dot)com&srch=3&prov=&utf8&reg=licensedregistrar(dot)com"

A specific template is accessed when the name/value pair "reg=licensedregistrar(dot)com" is parsed and passed as a variable. The accessed URI performs a WHOIS or RRP request transparent to the user to determine domain name availability. When the domain name is determined available, the domain name is inserted into the accessed template to generate the URI:

"http://www(dot)licensedregistrar(dot)com/cgi-bin/purchase/register(dot)cgi?name=thisnameisprobablyavailable(dot)com&refer=msie"

The name/value pair "refer=msie" is parsed and passed as a variable to determine the source of the URI redirection for the purposes of billing, tracking, and accounting. For instance, price discounts can be applied to those registrants who purchase domain names from a registration provider as a result of redirection, instead of purchasing directly from the same registrar at the regular price. In effect, such a price discount offers incentive for potential registrants to learn about this new method of registering domain names. Other name/value pairs can also be passed to determine whether the output is redirected to registration services, resolution services, and search services, alone or in any combination thereof.

As explained in U.S. Provisional Application Ser. No. 60/157,075 filed Oct. 1, 1999, by Schneider, entitled "Method and apparatus for integrating resource location and registration services of valid and fictitious domain names", a system can be integrated to process both registration requests and resolution requests of valid and fictitious domain names. Furthermore, as explained in U.S. patent application Ser. No. 09/525,350 filed Mar. 15, 2000, by Schneider, entitled "Method, product, and apparatus for requesting a network resource" and U.S. patent application Ser. No. 09/532,500 filed Mar. 21, 2000, by Schneider, entitled "Fictitious domain name method, product, and apparatus", an autosearch can be used to process registration requests or resolution requests of valid domain names and fictitious domain names.

Domain names offered by traditional domain name registries have been restricted to the ASCII character set: A to Z, a to z, 0 to 9, and hyphen. In addition, the maximum character length of a SLD is 63 characters. Any domain name that is not valid (e.g., SLD is greater than 63 characters, characters other than that of A to Z, a to z, 0 to 9, and hyphen, and/or non-ASCII character sets used to represent multilingual domain names) or any domain name having a domain alias such as a TLDA is called a fictitious domain name (FDN). Valid International Domain Names (VIDNs), Fictitious International Domain Names (FIDNs), Zip Code Domain Names, Numeric Domain Names (NDNs) such as ENUM Domain Names, Social Security Domain Names, Credit Card Number Domain Names, and other numerical domain names such as UPC domain names, Hybrid Domain Names (HDNs), Keyword (or search request) Domain Names (KDNs), Trademark Domain Names (TDNs), and Domain Alias Domain Names (DADNs) may all be specific types of FDNs.

Figure 10A:
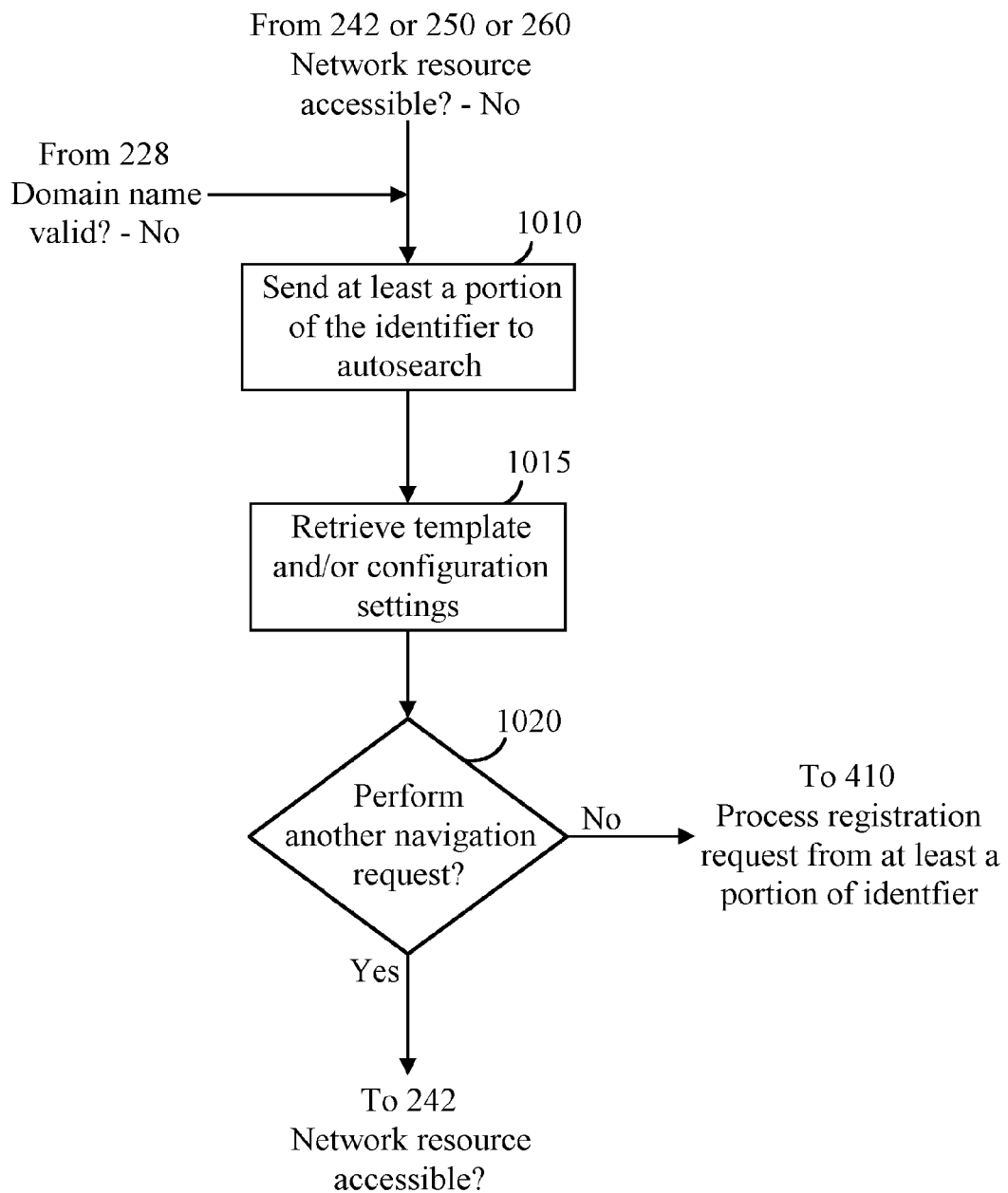
FIG. 10a illustrates the steps performed for processing a navigation request with an autosearch in accordance with the present invention.

FIG. 10a illustrates the steps performed for processing a navigation request with an autosearch. When a domain name is determined not valid (step 228) or when a network resource can not be accessed (step 242), can not be located (step 250), or particularly when a domain name can not be resolved (step 260), the domain name or at least a portion of an identifier can be passed or sent in step 1010 to an autosearch for further processing. A template 172 and/or configuration settings 174 may then be retrieved in step 1015 to determine how to further process the autosearch (e.g., determine how to construct another identifier). For instance, an identifier generation and registration form template may be retrieved for the purpose of generating several identifiers across several naming systems. A registration form may be provided in response to determining the availability of registration for all such generated identifiers.

If it is determined in step 1020 that another navigation request is to be performed then a resolvable URI is generated (not shown) and it may be further determined whether the newly generated URI is accessible (step 242). URI generation from the domain name passed to the autosearch may be accomplished by finding subdomains (as discussed in conjunction with FIG. 7a) or by generating a valid domain name from a fictitious domain name as discussed in co-pending applications noted above. When it is determined in step 1020 that another navigation request is not to be performed and a resolvable URI is not generated then the autosearch may redirect at least a portion of the identifier (step 410) to be processed as a registration request.

Figure 10B:
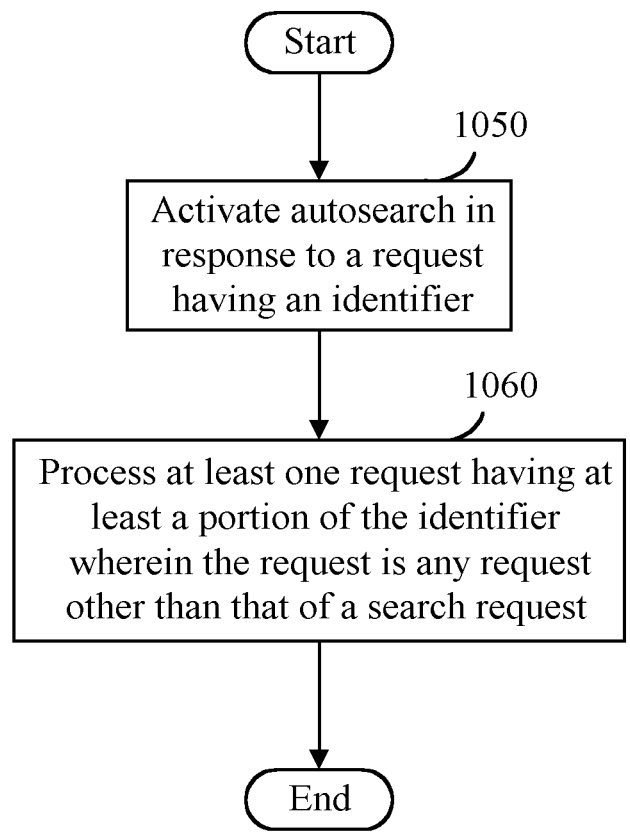
FIG. 10b illustrates a top-level flowchart of the steps performed for processing any non-search request with an autosearch in accordance with the present invention.
Figure 1D:
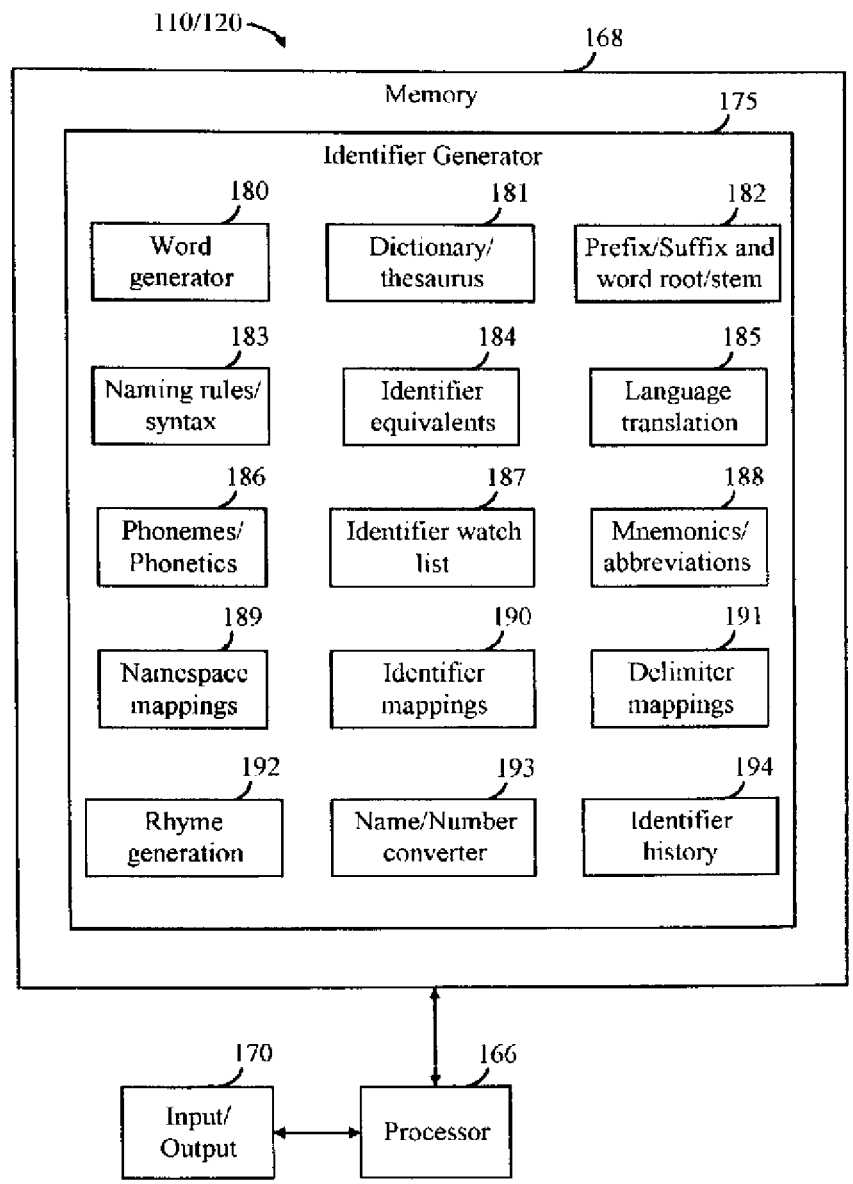
Figure 6A:
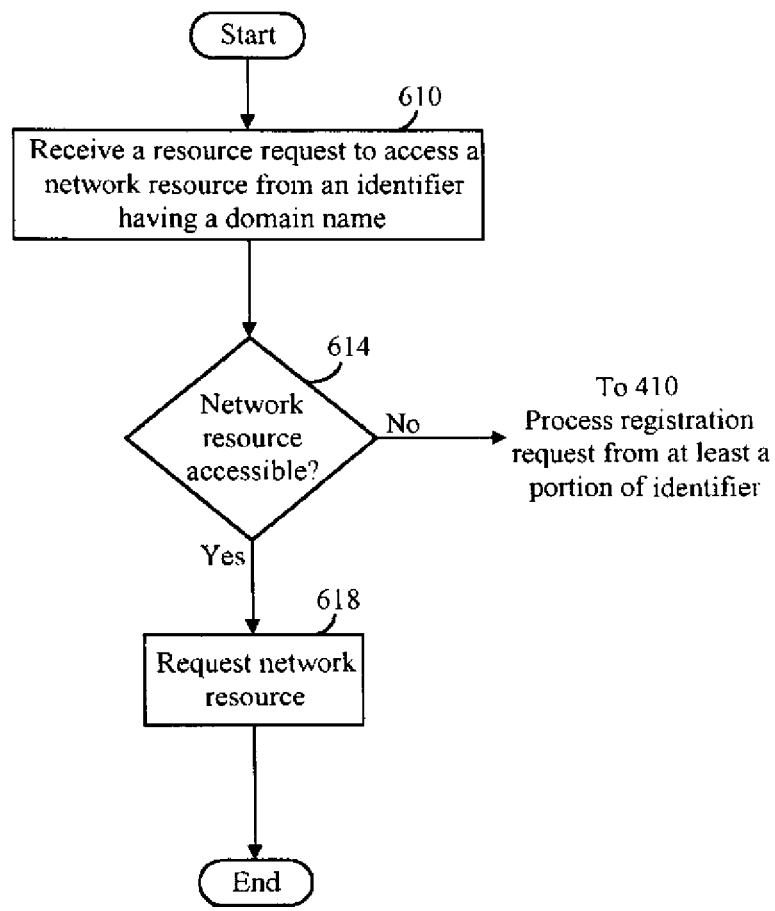
Figure 6B:
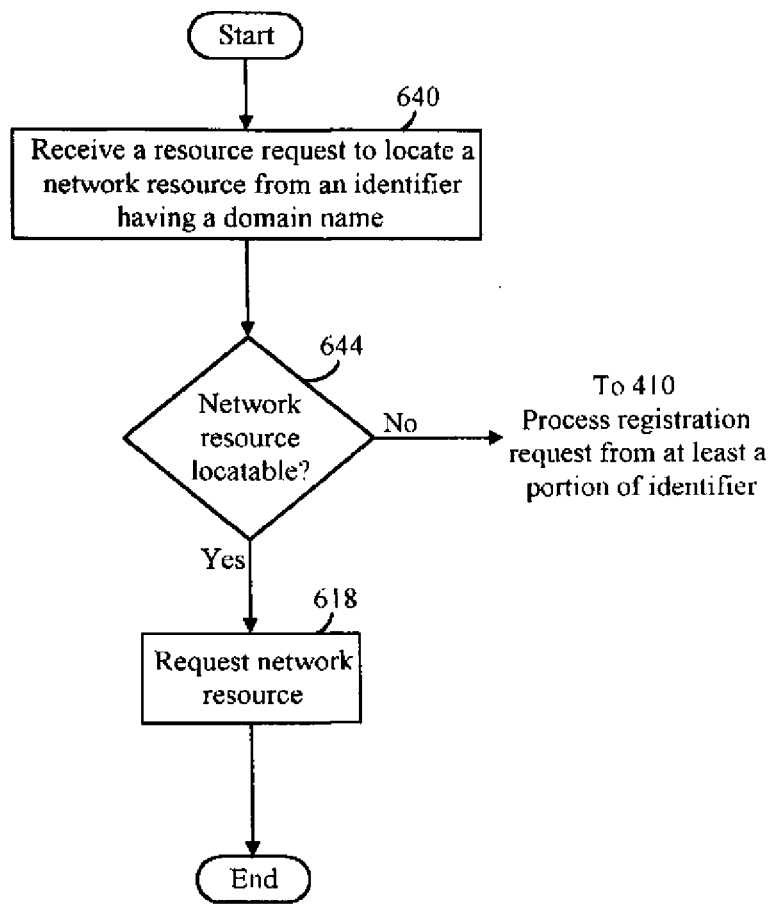
Figure 7B:
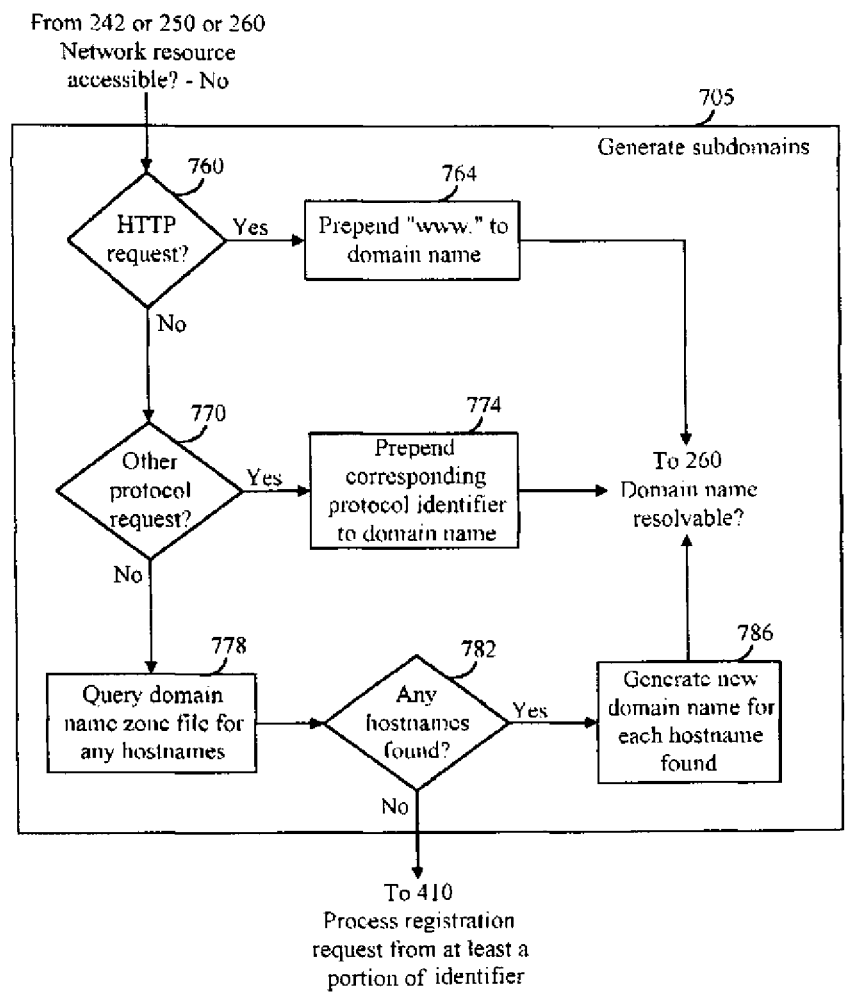
Figure 10A:
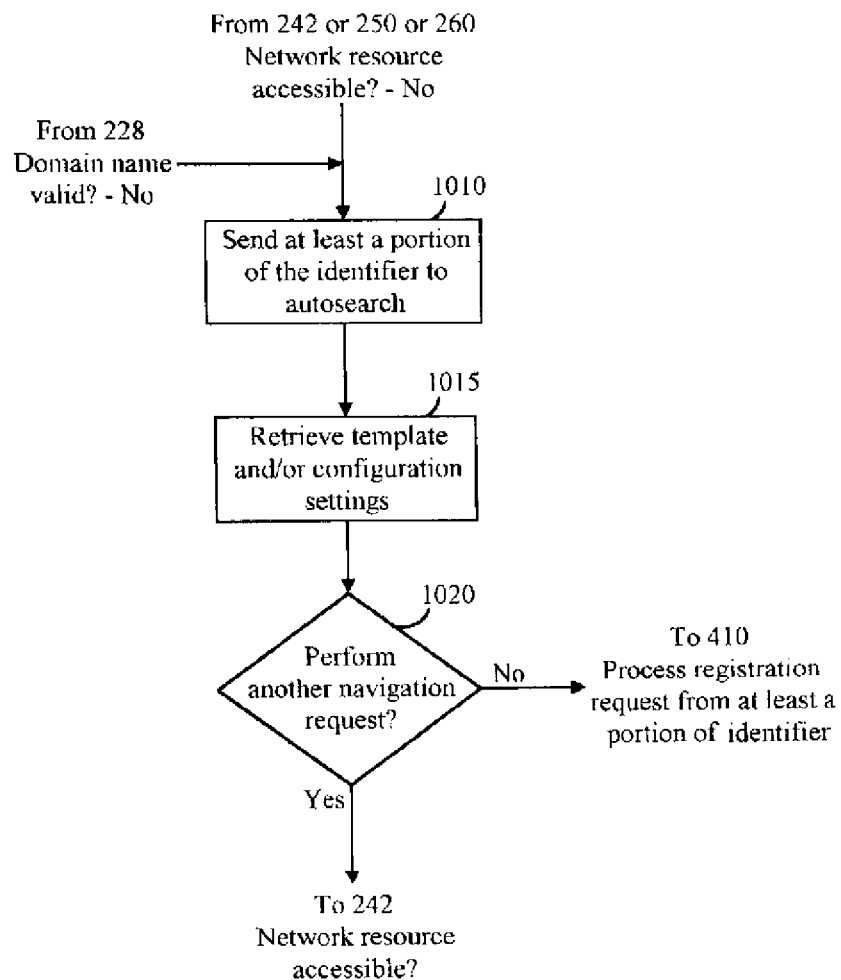

FIG. 10b illustrates a top-level flowchart of the steps performed for processing any request with an autosearch. To date, the autosearch feature has been used to further process search requests only and has not been used in conjunction with processing any other request type. When an autosearch is activated in step 1050 in response to a request having an identifier, at least one request is constructed and processed in step 1060 having at least a portion of the identifier wherein the request is any request other than that of a search request. Some request types may include a command request, resolution request, redirection request, identifier registration request, commerce request, subscription request, navigation request, dialing request, messaging request, conferencing request, vendor request, service request, login request, status request, authorization request, reference request, etc.

Because of the extended functionality provided in one aspect of the present invention, a user can now determine domain name availability directly from the command line of a network access device 110 or location field 154 of a browser program 112. Though domain name availability can also be determined by processing a WHOIS or RRP request before the step of determining domain name resolvability, this is not a preferred method because it requires the utilization of unnecessary bandwidth. Standard network utility packages such as PING, NSLOOKUP, DIG, HOST to name a few can also be used to determine domain name resolvability. These tools can be modified to provide other means for host/address translation.

Because DNS lookups and WHOIS or RRP requests are so heavily relied on, methods for minimizing network bandwidth of these services are considered preferable. For instance, the resolver library and/or client browser 112 may be configured to first access a zone file or similar file cache 176 to increase host/address translation lookup performance. A domain name that can not be translated into an IP address implies that a domain name is available and therefore the step of performing a WHOIS or RRP request does not have to be relied on. However, due to DNS server time-outs or the propagation of DNS record updates, the results of retrieving if at all, a corresponding translated IP address may be affected. Therefore it is desired to rely on the step of performing a WHOIS or RRP request for the purpose of verification in real-time that a domain name determined unresolvable is truly available.

Modifications for URI redirection to registration services such as an accredited registrar may be made to either the resolver library, client browser, or any server or nameserver that processes an identifier resolution request (e.g., Registry name server, Realnames or Netword resolver/server). Also, the determination of domain name availability and/or the processing of a registration request may occur either automatically or manually in response to the determination of an unresolvable domain name. There may further be included any number of other steps that may be performed between the step of determining that a domain name is unresolvable and determining that the unresolvable domain name may be available for registration. Furthermore, redirection to registration services is not limited to the redirection of only registrars, but further includes redirection to registries, resellers, affiliates, and the like.

The invention does not rely upon the browser's location field 154. For instance, the location field 154 of the web browser can be suppressed and a web page based location field 154 can be displayed. A CGI script is then used to process the input in step 210 and redirect the browser 112 to the appropriate registrar. In lieu of either exclusive, user selected, least cost, or random registrar redirection of services, the completed NIC registration form can be sent to such a registrar and processed in a way that is transparent to the user and does not interfere with the current user's on-line navigational session.

The same teachings can be applied to those skilled in the art by providing a text box object as input that can be located anywhere and on any web page including a text box that is embedded or part of an on-line advertisement. The text box object can be used in a stand-alone application and stored on magnetic and/or optical media that is either non-volatile, writable, removable, or portable. The text box object can be incorporated as an applet or servlet and embedded in other applications. The text box can be integrated in the task bar or any part of the GUI's OS, or the OS bypassed and overlaid as a graphic on a display device based on modifications to a video card and/or it's associated firmware or software drivers. The command line text box can be further overlaid as an interactive object in other embodiments such as Internet television, cable television, digital television, or interactive television through an Internet appliance or set top box.

At least a portion of the registration request can be processed from an autosearch. Autosearch templates may be adapted to determine the availability of registration in response to generating many identifiers across many naming systems. The registration request can be processed in response to determining that the network resource can not be accessed. A network resource that can not be accessed can be determined by attempting to access the network resource from the identifier and determining that the access attempt is unsuccessful or by determining whether the network resource can be located. A network resource that can not be located can be determined by attempting to locate the network resource and determining that the location attempt is unsuccessful or by determining whether the domain name is resolvable. Network bandwidth required to determine that the network resource can not be accessed/located can be minimized. Network bandwidth required to determine whether a domain name is resolvable can be minimized.

When it is determined that the first domain name is resolvable it can be determined whether the network resource can be located and when it is determined that the first domain name is not resolvable, a registration request can be processed. When it is determined that the network resource can be located it can be determined whether the network resource can be accessed and when it is determined that the network resource can not be located, a registration request can be processed.

A domain name can be translated into an IP address by accessing at least one resource record from at least one zone file or file cache. A resource record can be a wildcard resource record having an IP address corresponding to a network resource adapted to determine which domain name registration provider of a plurality of domain name registration providers can process the registration request when it is determined that the first domain name is available for registration.

The registration request can be a domain name registration request and/or keyword registration request. The domain name registration request and keyword registration request can be contemporaneously processed. Domain name registration provider can be a domain name registrar, domain name reseller, or domain name affiliate. Keyword registration provider can be a keyword registrar, keyword reseller, and keyword affiliate. A keyword registration provider of a plurality of keyword providers can be selected to process the keyword registration request.

In a keyword registration request, at least one keyword can be generated from the identifier and determined whether the at least one keyword is resolvable. A keyword resolution request can be processed from the at least one keyword when the at least one keyword is determined resolvable. It can be determined whether the at least one keyword is available for keyword registration when the at least one keyword is determined not resolvable.

The keyword resolution request can be processed by accessing at least one network resource from the at least one keyword. At least one of a keyword resolver system and file cache can be queried to determine whether the at least one keyword is resolvable. A keyword registration form can be generated when the at least one keyword is determined available for registration and keyword registrant information can be provided when the at least one keyword is determined not available for registration. The keyword registration form can include a domain name registration form.

Related domain names may be generated from a first domain name and determined whether such generated domain names are available for registration by performing a WHOIS request on the first domain name and any the related domain names when processing a domain name registration request. A domain name registration form may be generates for each domain name determined available for registration and registrant information may be provided for each domain name determined not available for registration. A domain name registration form also includes a keyword registration form or may include any other identifier registration form.

The domain name registration provider is at least one of a domain name registrar, domain name reseller, and domain name affiliate. It can be determined which domain name registration provider of a plurality of domain name registration providers will process the domain name registration request by retrieving one of a default named domain name registration provider and a method of selecting a domain name registration provider from one of an autosearch template and modifiable configuration settings. The method of selecting a domain name registration provider is chosen from the least cost domain name registration provider, a preselected list of domain name registration provider, and a random choice of domain name registration provider. The method of selecting the least cost domain name registration provider can include the step of consulting a table of registration cost information updated in real time.

A second domain name can be generated from the first domain name wherein the second domain name is a subdomain of the first domain name. The identifier includes a protocol identifier, the network resource request includes a protocol request, the subdomain corresponds to the protocol identifier, and the step of determining whether the second domain name can be generated includes the step of generating the second domain name. The protocol identifier can be "http" and the subdomain can be "www". The protocol identifier and the subdomain can be from a group consisting of ftp, telnet, news, and gopher.

It can be determined whether the second domain name can be generated by determining whether at least one hostname of the first domain name can be identified. The second domain name can be generated by prepending a hostname to the first domain name. The second domain name can be generated in response to determining that the second domain name can be generated. It can be determined whether the network resource can be accessed from the second domain name. The network resource can be accessed in response to determining that the network resource can be accessed from the second domain name. A registration request can be processed when it is determined that that the second domain name can not be generated. When the network resource can not be accessed from the second domain name, it can be determined whether another subdomain of the first domain name can be generated until it is determined that the another subdomain of the first domain name can not be generated.

The first domain name can be a FDN and a valid domain name can be generated from at least a portion of the identifier and determined whether the network resource can be accessed from the valid domain name. A registration request having the FDN can be processed when it is determined that said valid domain name can not be accessed. The valid domain name can be generated from an autosearch.

The identifier can be a uniform resource identifier (URI). The URI can be a uniform resource locator. A search request from the identifier can be constructed, processed, and presented. It can be determined whether to process a search request after processing the registration request. The identifier can be received from internal automation, external automation, activation of a hyperlink, network resource redirection, and input such as a user interface element. Inputting the identifier into a user interface element may include the step of inputting the identifier into one of a browser location field, text box, command line, speech to text interface, optical recognition interface, and magnetic recognition interface. A user interface element may include one of a web page, hyperlink, message box, and prompt and is presented to determine whether to process the registration request particularly when a network resource can not be accessed.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (i.e., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A method comprising:
processing a network resource request associated with an identifier, wherein the network resource request is configured to effect access to a network resource identified by the identifier and wherein the processing comprises, at least in part, attempting to access the network resource;
determining at a computing device that the network resource of the network resource request cannot be accessed;
generating a registration request in direct response to determining that the network resource cannot be accessed, the registration request comprising at least one of: a domain name registration request or keyword registration request, the registration request having at least a portion of the identifier for purchase of a registered asset comprising: at least one of a domain name or keyword, the registered asset configured to point to a network resource associated with the identifier in response to receiving a query comprising the registered asset; and
using registrant information as input for the registration request to effect the purchase of the registered asset.

2. The method of claim 1, wherein generating the registration request comprises generating both the domain name registration request and the keyword registration request.

3. The method of claim 1, further comprising selecting a keyword registration provider from a plurality of keyword providers to process the keyword registration request.

4. The method of claim 3, wherein the keyword registration provider comprises at least one of a keyword registrar, keyword reseller, keyword advertiser, or keyword affiliate.

5. The method of claim 1, wherein processing the keyword registration request comprises:
generating at least one keyword from the identifier; and
determining whether the at least one keyword is at least one of resolvable or available to be registered for advertising.

6. The method of claim 5, further comprising:
processing a keyword resolution request from the at least one keyword in response to determining the at least one keyword is resolvable; and
determining whether the at least one keyword is available for keyword registration in response to determining the at least one keyword is not resolvable.

7. The method of claim 6, wherein processing the keyword resolution request comprises accessing at least one network resource from the at least one keyword.

8. The method of claim 6, wherein determining whether the at least one keyword is resolvable comprises querying at least one of a keyword resolver system or file cache.

9. The method of claim 6, further comprising:
generating a keyword registration form in response to determining the at least one keyword is available for registration; and
providing keyword registrant information in response to determining the at least one keyword is not available for registration.

10. The method of claim 9, wherein the keyword registration form includes a domain name registration form.

11. The method of claim 1, wherein processing the domain name registration request comprises:
determining related domain names related to the domain name;
generating one or more of the related domain names in response to determining related domain names.

12. The method of claim 11, wherein processing the domain name registration request comprises determining whether the domain name or at least one of the related domain names are available for registration.

13. The method of claim 12, wherein determining whether the domain name or at least one of the related domain names are available for registration comprises performing a WHOIS request on the domain name or the at least one of the related domain names.

14. The method of claim 12, further comprising:
generating a domain name registration form for each domain name determined available for registration from the domain name or the at least one of the related domain names; and
providing registrant information for each domain name determined not available for registration from the domain name or the at least one of the related domain names.

15. The method of claim 14, wherein the domain name registration form includes a keyword registration form.

16. The method of claim 12, further comprising selecting a domain name registration provider from a plurality of domain name registration providers to process the domain name registration request.

17. The method of claim 16, wherein the domain name registration provider comprises at least one of a domain name registrar, domain name reseller, or domain name affiliate.

18. The method of claim 16, wherein selecting a domain name registration provider from a plurality of domain name registration providers comprises selecting a domain name registration provider from at least one of a template or modifiable configuration settings.

19. The method of claim 18, further comprising accessing the template or the modifiable configuration settings from an autosearch.

20. A non-transitory computer readable medium having instructions stored thereon, the instructions configured to cause a computing device to perform operations comprising:
process a network resource request associated with an identifier, the network resource request configured to effect access to a network resource identified by the identifier and wherein the processing comprises, at least in part, attempting to access the network resource;
determine at a computing device that the network resource of the network resource request cannot be accessed;

generate a registration request in direct response to determining that the network resource cannot be accessed, the registration request comprising at least one of: a domain name registration request or keyword registration request, the registration request having at least a portion of the identifier for purchase of a registered asset comprising: at least one of a domain name or keyword, the registered asset configured to point to a network resource associated with the identifier in response to receiving a query comprising the registered asset; and use registrant information as input for the registration request to effect the purchase of the registered asset.

21. The non-transitory computer readable medium of claim 20, wherein the instructions configured to cause a computing device to perform operations comprising process the registration request comprises process the domain name registration request and the keyword registration request.

22. The non-transitory computer readable medium of claim 20, wherein the instructions configured to process the keyword registration request comprise instructions configured to cause a computing device to perform operations comprising:

generate at least one keyword from the identifier; and determine whether the at least one keyword is at least one of resolvable or available to be registered for advertising.

23. The non-transitory computer readable medium of claim 22, the instructions further configured to cause a computing device to perform operations comprising:

process a keyword resolution request from the at least one keyword in response to determining the at least one keyword is resolvable; and determine whether the at least one keyword is available for keyword registration in response to determining the at least one keyword is not resolvable.

24. The non-transitory computer readable medium of claim 23, the instructions further configured to cause a computing device to perform operations comprising:

generate a keyword registration form in response to determining the at least one keyword is available for registration; and provide keyword registrant information in response to determining the at least one keyword is not available for registration.

25. The non-transitory computer readable medium of claim 20, wherein the instructions configured to cause a computing device to process the domain name registration request include instructions configured to cause a computing device to perform operations comprising:

determine related domain names related to the domain name; and generate one or more of the related domain names in response to determining related domain names.

26. The non-transitory computer readable medium of claim 25, wherein the instructions configured to cause a computing device to process the domain name registration request comprise instructions configured to cause a computing device to perform operations comprising determine whether the domain name or at least one of the related domain names are available for registration.

27. The non-transitory computer readable medium of claim 26, wherein the instructions configured to cause a computing device to determine whether the first domain name or at least one of the related domain names are available for registration comprise instructions configured to cause a computing device to perform operations comprising perform a WHOIS request on the domain name or the at least one of the related domain names.

28. The non-transitory computer readable medium of claim 26, the instructions further configured to cause a computing device to perform operations comprising:

generate a domain name registration form for each domain name determined available for registration from the domain name or the at least one of the related domain names; and provide registrant information for each domain name determined not available for registration from the domain name or the at least one of the related domain names.

* * * * *

UNITED STATES PATENT AND TRADEMARK OFFICE
CERTIFICATE OF CORRECTION

| | | |
|---|---|---|
| PATENT NO. | : 8,635,340 B1 | Page 1 of 7 |
| APPLICATION NO. | : 11/687672 | |
| DATED | : January 21, 2014 | |
| INVENTOR(S) | : Schneider | |

It is certified that error appears in the above-identified patent and that said Letters Patent is hereby corrected as shown below:

On the Title Page

On Page 4, item (56), under "OTHER PUBLICATIONS", in Column 2, Line 54, delete "Resposne" and insert -- Response --, therefor.

On Page 5, item (56), under "OTHER PUBLICATIONS", in Column 1, Line 33, delete "Berkely" and insert -- Berkeley --, therefor.

On Page 5, item (56), under "OTHER PUBLICATIONS", in Column 1, Line 44, delete "Trasfer" and insert -- Transfer --, therefor.

On Page 5, item (56), under "OTHER PUBLICATIONS", in Column 1, Line 53, delete "Schol," and insert -- School, --, therefor.

On Page 5, item (56), under "OTHER PUBLICATIONS", in Column 1, Line 62, delete "http:-ww." and insert -- http:-www. --, therefor.

On Page 5, item (56), under "OTHER PUBLICATIONS", in Column 2, Line 13, delete "Califorrnia." and insert -- California. --, therefor.

On Page 5, item (56), under "OTHER PUBLICATIONS", in Column 2, Line 34, delete "the .us" and insert -- the US --, therefor.

In the Drawings

In the drawing sheets, consisting of Figs. 1d, 6a, 6b, 7b, and 10a, should be deleted to be replaced with the drawing sheets, consisting of Figs. 1d, 6a, 6b, 7b, and 10a, as shown on the attached pages.

Signed and Sealed this
First Day of July, 2014

Michelle K. Lee
*Deputy Director of the United States Patent and Trademark Office*

CERTIFICATE OF CORRECTION (continued)
U.S. Pat. No. 8,635,340 B1

In the Specification

In Column 3, Line 27, delete "NET_GetURL( )" and insert -- NET_GetURL( ). --, therefor.

In Column 3, Line 31, delete "NET_BeginConnect()" and insert -- NET_BeginConnect( ). --, therefor.

In Column 3, Line 32, delete "NET_FindAddress( )" and insert -- NET_FindAddress( ), --, therefor.

In Column 3, Line 37, delete "InternetExplorer" and insert -- Internet Explorer --, therefor.

In Column 3, Line 60, delete "japan" and insert -- Japan --, therefor.

In Column 4, Line 18, delete "Verisign)" and insert -- VeriSign) --, therefor.

In Column 8, Line 50, delete "is knew no" and insert -- is no --, therefor.

In Column 21, Line 48, delete "(UFO," and insert -- (UFI), --, therefor.